United States Patent
Rihn

(10) Patent No.: US 9,588,586 B2
(45) Date of Patent: Mar. 7, 2017

(54) PROGRAMMABLE HAPTIC DEVICES AND METHODS FOR MODIFYING HAPTIC STRENGTH BASED ON PERSPECTIVE AND/OR PROXIMITY

(71) Applicant: Immersion Corporation, San Jose, CA (US)

(72) Inventor: William Rihn, San Jose, CA (US)

(73) Assignee: Immersion Corporation, San Jose, CA (US)

(*) Notice: Subject to any disclaimer, the term of this patent is extended or adjusted under 35 U.S.C. 154(b) by 116 days.

(21) Appl. No.: 14/534,398

(22) Filed: Nov. 6, 2014

(65) Prior Publication Data

US 2015/0355711 A1  Dec. 10, 2015

Related U.S. Application Data

(60) Provisional application No. 62/009,898, filed on Jun. 9, 2014.

(51) Int. Cl.
*G08B 6/00* (2006.01)
*G06F 3/01* (2006.01)
(Continued)

(52) U.S. Cl.
CPC ............ *G06F 3/016* (2013.01); *A63F 13/285* (2014.09); *A63F 13/5252* (2014.09);
(Continued)

(58) Field of Classification Search
CPC .......... G06F 3/016; G06F 3/011; G06F 3/012; G06F 3/017; G06F 2203/013;
(Continued)

(56) References Cited

U.S. PATENT DOCUMENTS 8,508,486 B2  8/2013 Grant et al.
8,698,759 B2  4/2014 Shin
(Continued)

FOREIGN PATENT DOCUMENTS

EP  0 875 819  11/1998
EP  2 648 071  10/2013
(Continued)

OTHER PUBLICATIONS

"Extended European Search Report", Application No. 15 17 1012.6, Oct. 9, 2015.
Office Action, U.S. Appl. No. 14/727,465, Oct. 6, 2016.

*Primary Examiner* — Jack K Wang
(74) *Attorney, Agent, or Firm* — Medler Ferro Woodhouse & Mills PLLC

(57) ABSTRACT

Embodiments hereof relate a system including a host computer configured to generate a virtual environment to a user on a display, a processor, a haptic peripheral, and a proximity sensor. The haptic peripheral includes an actuator, wherein the actuator is configured to receive a control signal from the processor and output a haptic effect to the haptic peripheral in response to the control signal from the processor. The processor is configured to vary the control signal for the actuator depending on a virtual distance within the virtual environment between a virtual camera and a virtual object. In addition or alternatively, the processor is configured to vary the control signal for the actuator depending on a perspective of a virtual camera within the virtual environment.

23 Claims, 14 Drawing Sheets

(51) Int. Cl.
| | |
|---|---|
| *G06T 15/20* | (2011.01) |
| *G06T 19/20* | (2011.01) |
| *G06F 3/0481* | (2013.01) |
| *A63F 13/285* | (2014.01) |
| *A63F 13/5252* | (2014.01) |
| *G06F 17/00* | (2006.01) |
| *G06F 3/048* | (2013.01) |
| *G06F 3/033* | (2013.01) |
| *G06T 15/00* | (2011.01) |

(52) U.S. Cl.
CPC .............. *G06F 3/011* (2013.01); *G06F 3/012* (2013.01); *G06F 3/017* (2013.01); *G06F 3/04815* (2013.01); *G06T 15/20* (2013.01); *G06T 19/20* (2013.01); *G06F 2203/013* (2013.01); *G06F 2203/015* (2013.01); *G06F 2203/04806* (2013.01)

(58) Field of Classification Search
CPC ..... G06F 2203/015; G06F 2203/04806; A63F 13/285; A63F 13/5252; G06T 15/20; G06T 19/20
USPC ........................................................ 340/407.2
See application file for complete search history.

(56) References Cited

U.S. PATENT DOCUMENTS

| | | |
|---|---|---|
| 8,754,757 B1 | 6/2014 | Ullrich et al. |
| 2009/0289779 A1 | 11/2009 | Braun et al. |
| 2010/0302015 A1 | 12/2010 | Kipman et al. |
| 2011/0216060 A1* | 9/2011 | Weising .................. G09G 5/08 345/419 |
| 2011/0248837 A1 | 10/2011 | Israr et al. |
| 2012/0038582 A1* | 2/2012 | Grant ...................... G06F 3/016 345/174 |
| 2012/0062491 A1 | 3/2012 | Coni et al. |
| 2012/0269332 A1 | 10/2012 | Mukund |
| 2013/0131851 A1 | 5/2013 | Ullrich et al. |
| 2013/0194085 A1 | 8/2013 | Grant et al. |
| 2013/0202134 A1 | 8/2013 | Afshar |
| 2013/0227410 A1 | 8/2013 | Sridhara et al. |
| 2013/0265286 A1 | 10/2013 | Da Costa et al. |
| 2014/0056461 A1 | 2/2014 | Afshar |
| 2014/0176415 A1 | 6/2014 | Buuck et al. |
| 2015/0077324 A1 | 3/2015 | Birnbaum et al. |
| 2015/0091947 A1* | 4/2015 | Rakow .................. G09G 5/373 345/667 |
| 2015/0326972 A1 | 11/2015 | Barton |
| 2015/0331576 A1* | 11/2015 | Piya .................... G06F 3/04815 715/850 |
| 2015/0339588 A1* | 11/2015 | Cardonha .............. G06F 3/016 706/11 |
| 2015/0350803 A1 | 12/2015 | Wyatt et al. |

FOREIGN PATENT DOCUMENTS

| | | |
|---|---|---|
| EP | 2 873 447 | 5/2015 |
| WO | 2011/011552 | 1/2011 |

* cited by examiner

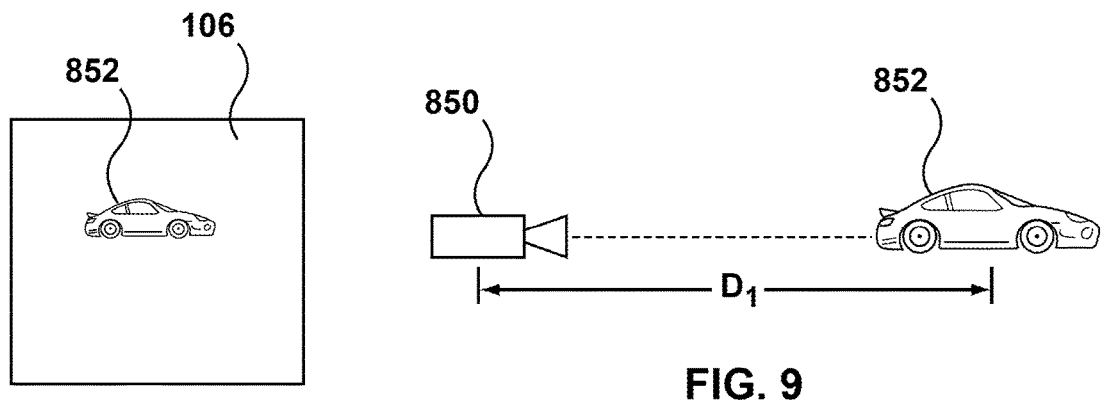
FIG. 8
FIG. 9
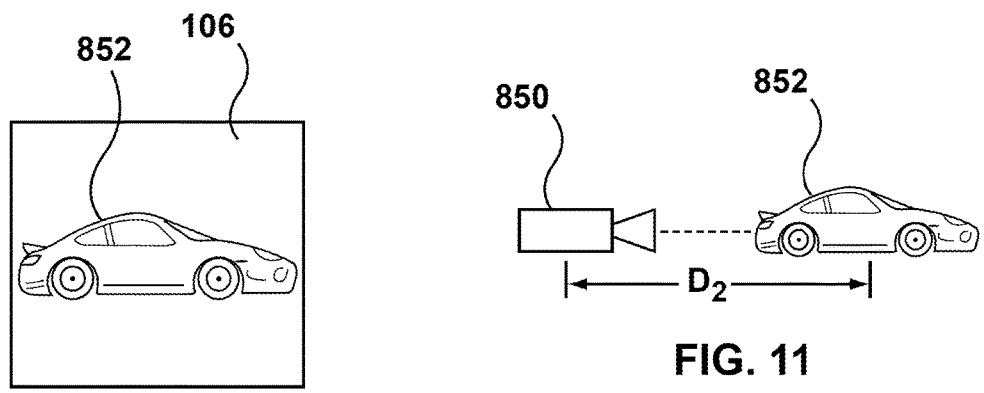
FIG. 10
FIG. 11

PROGRAMMABLE HAPTIC DEVICES AND METHODS FOR MODIFYING HAPTIC STRENGTH BASED ON PERSPECTIVE AND/OR PROXIMITY

CROSS-REFERENCE TO RELATED APPLICATIONS

This application claims the benefit of U.S. Provisional Patent Application Ser. No. 62/009,898, filed Jun. 9, 2014, which is hereby incorporated by reference in its entirety for all purposes.

FIELD OF THE INVENTION

Embodiments hereof relate to systems and methods for providing haptic effects or feedback.

BACKGROUND OF THE INVENTION

Video games and virtual reality systems have become even more popular due to the marketing toward, and resulting participation from, casual gamers. In a typical implementation, a computer system displays a visual or graphical environment to a user on a display device. Users can interact with the displayed environment by inputting commands or data from the interface device. The computer updates the environment in response to the user's manipulation of a moved manipulandum such as a joystick handle and provides visual feedback to the user using the display screen.

Conventional video game devices or controllers use visual and auditory cues to provide feedback to a user. In some interface devices, kinesthetic feedback (such as active and resistive haptic feedback) and/or tactile feedback (such as vibration, texture, and heat) is also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment. Conventional haptic feedback systems for gaming and other devices generally include an actuator for generating the haptic feedback attached to the housing of the controller/peripheral. More particularly, motors or other actuators of the interface device are housed within the controller and are connected to the controlling computer system. The computer system receives sensor signals from the interface device and sends appropriate haptic feedback control signals to the actuators. The actuators then provide haptic feedback to the controller. The computer system can thus convey physical sensations to the user in conjunction with other visual and auditory feedback.

There is a need for haptic feedback systems that provide variation of haptic effects not previously available to provide a more immersive and enjoyable experience for the user.

BRIEF SUMMARY OF THE INVENTION

Embodiments hereof relate a system including a host computer configured to generate a virtual environment to a user on a display, a processor, and a haptic peripheral. The haptic peripheral includes an actuator, wherein the actuator is configured to receive a control signal from the processor and output a haptic effect to the haptic peripheral in response to the control signal from the processor. The processor is configured to vary the control signal for the actuator depending on a zoom state of a virtual camera of the virtual environment such that a first zoom state results in the actuator generating and applying a first haptic effect and a second zoom state results in the actuator generating and applying a second haptic effect. A virtual object appears closer in the second zoom state than in the first zoom state and the first haptic effect is weaker than the second haptic effect.

Embodiments hereof also relate a system including a host computer configured to generate a virtual environment to a user on a display, a haptic peripheral, and a processor. The haptic peripheral includes an actuator, wherein the actuator is configured to receive a control signal from the processor and output a haptic effect to the haptic peripheral in response to the control signal from the processor. The processor is configured to vary the control signal for the actuator depending on a perspective of a virtual camera within the virtual environment such that a first perspective results in the actuator generating and applying a first haptic effect and a second perspective results in the actuator generating and applying a second haptic effect, the first haptic effect being different than the second haptic effect.

Embodiments hereof also relate a system including a host computer configured to generate a virtual environment to a user on a display, a haptic peripheral, and a processor. The haptic peripheral includes an actuator, wherein the actuator is configured to receive a control signal from the processor and output a haptic effect to the haptic peripheral in response to the control signal from the processor. The processor is configured to vary the control signal for the actuator depending on a zoom state of a virtual camera of the virtual environment such that a first zoom state results in the actuator generating and applying a first haptic effect and a second zoom state results in the actuator generating and applying a second haptic effect. A virtual object appears closer in the second zoom state than in the first zoom state. The processor is also configured to vary the control signal for the actuator depending on a perspective of the virtual camera within the virtual environment such that a first perspective results in the actuator generating and applying a third haptic effect and a second perspective results in the actuator generating and applying a fourth haptic effect. The first haptic effect, the second haptic effect, the third haptic effect, and the fourth haptic effect differ from each other.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 8 is an illustration of a display of the system of FIG. 1, wherein the display displays a virtual object thereon.

FIG. 9 is a schematic illustration of a virtual distance between a virtual camera of the system of FIG. 1 and the virtual object of FIG. 8.

FIG. 10 is an illustration of a display of the system of FIG. 1, wherein the display displays a virtual object thereon.

FIG. 11 is a schematic illustration of a virtual distance between a virtual camera of the system of FIG. 1 and the virtual object of FIG. 10.

DETAILED DESCRIPTION OF THE INVENTION

Figure 1:
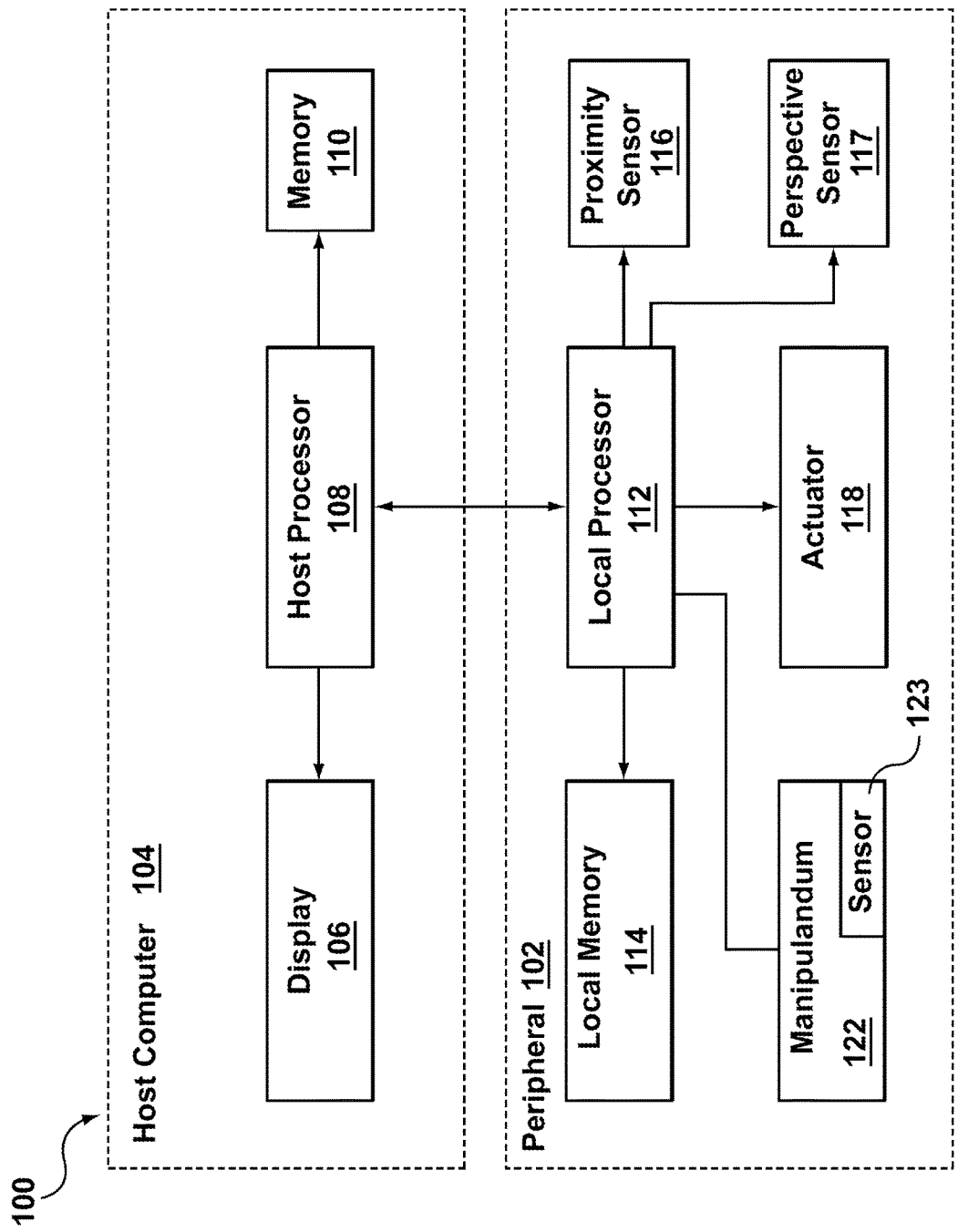
FIG. 1 is a block diagram of a system for providing haptic feedback to a haptic peripheral according to an embodiment hereof.

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is primarily directed to gaming devices and controllers for gaming devices, those skilled in the art would recognize that the description applies equally to other virtual reality systems and peripherals for the virtual reality systems.

Embodiments hereof relate a system including a host computer configured to generate a virtual environment to a user on a display, a processor, and a haptic peripheral. The haptic peripheral includes an actuator, wherein the actuator is configured to receive a control signal from the processor and output a haptic effect to the haptic peripheral in response to the control signal from the processor. According to an embodiment hereof, which will be described in more detail herein with respect to the figures, the processor is configured to vary the control signal for the actuator depending on a virtual distance within the virtual environment between a virtual camera and a virtual object that is a source or cause of a haptic effect. Stated another way, the processor is configured to vary the control signal for the actuator depending on a zoom state of a virtual camera. For example, a first virtual distance (or first zoom state) results in the actuator generating and applying a first haptic effect and a second virtual distance (or second zoom state) results in the actuator generating and applying a second haptic effect. The first virtual distance is greater than the second virtual distance (or a virtual object appears closer to the user in the second zoom state than in the first zoom state) and the first haptic effect is weaker than the second haptic effect. According to another embodiment hereof, which will be described in more detail herein with respect to the figures, the processor is configured to vary the control signal for the actuator depending on a perspective of a virtual camera within the virtual environment such that a first perspective results in the actuator generating and applying a first haptic effect and a second perspective results in the actuator generating and applying a second haptic effect, the first perspective being a first person point of view and the second perspective being a third person point of view, and the first haptic effect being different than the second haptic effect. For example, the first haptic effect relates to a trigger effect and the second haptic effect relates to an ambient effect. According to yet another embodiment hereof, which will be described in more detail herein with respect to the figures, the processor may be configured to vary the control signal for the actuator depending on a virtual camera position within the virtual environment and also may be configured to vary the control signal for the actuator depending on a virtual camera perspective within the virtual environment.

Figure 2:
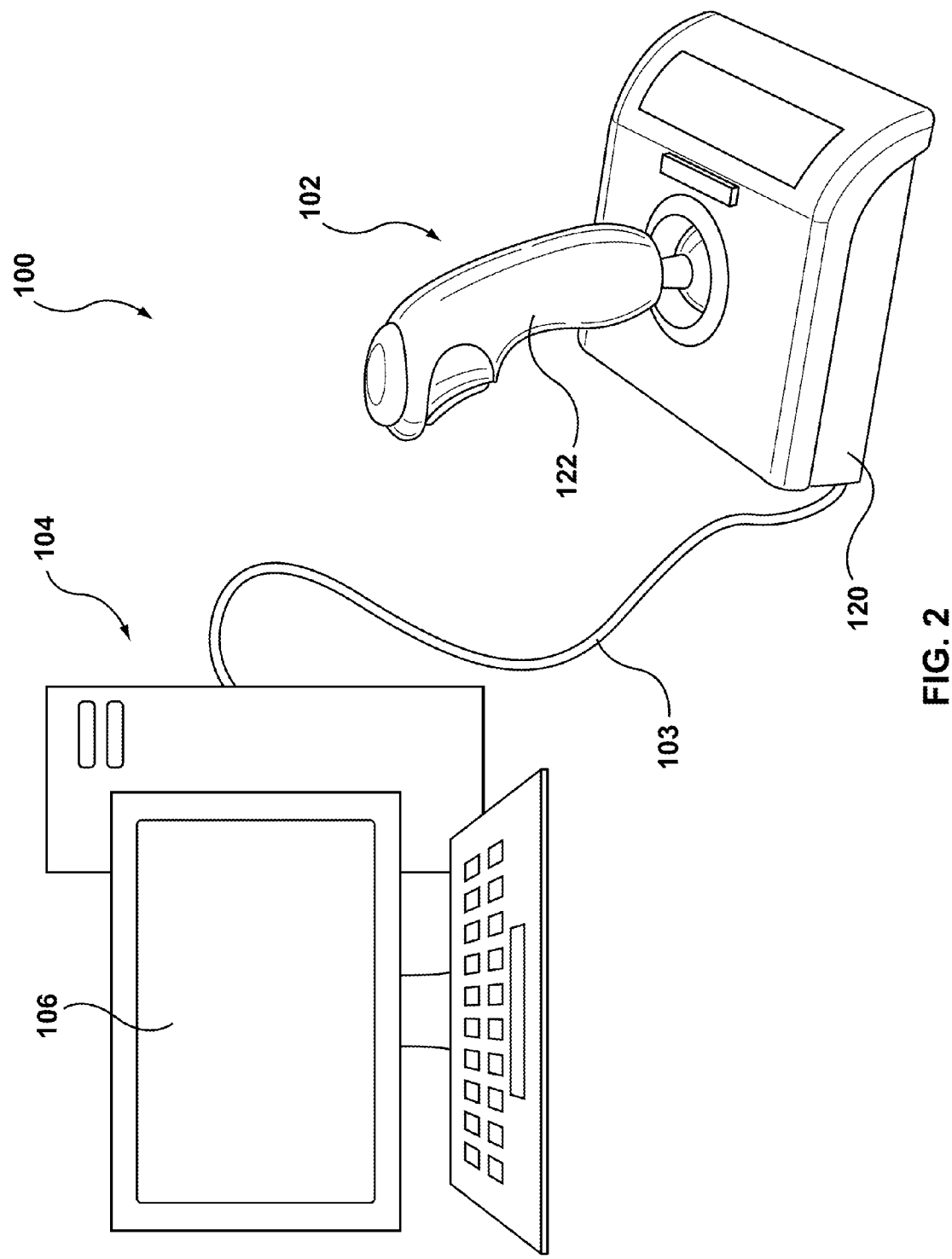
FIG. 2 is a schematic illustration of the system of FIG. 1, wherein the haptic peripheral is a haptic joystick.
Figure 4:
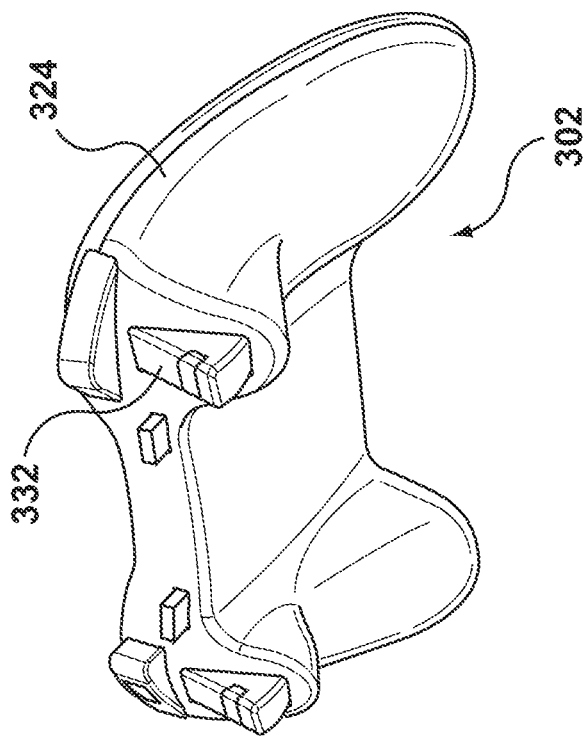
FIGS. 3 and 4 are perspective views of a haptic peripheral according to an embodiment hereof, wherein the haptic peripheral is a handheld gaming controller.
Figure 3:
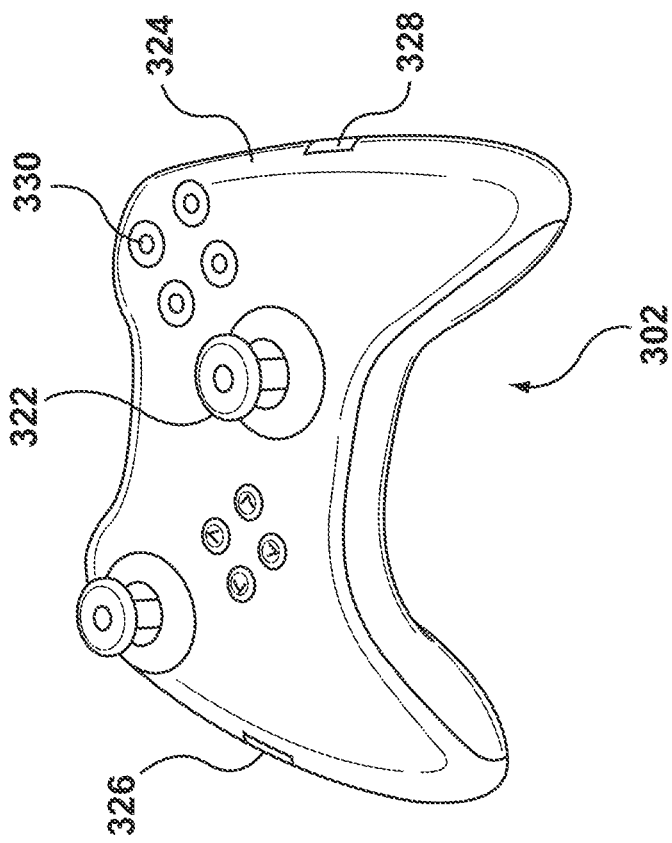
Figure 5:
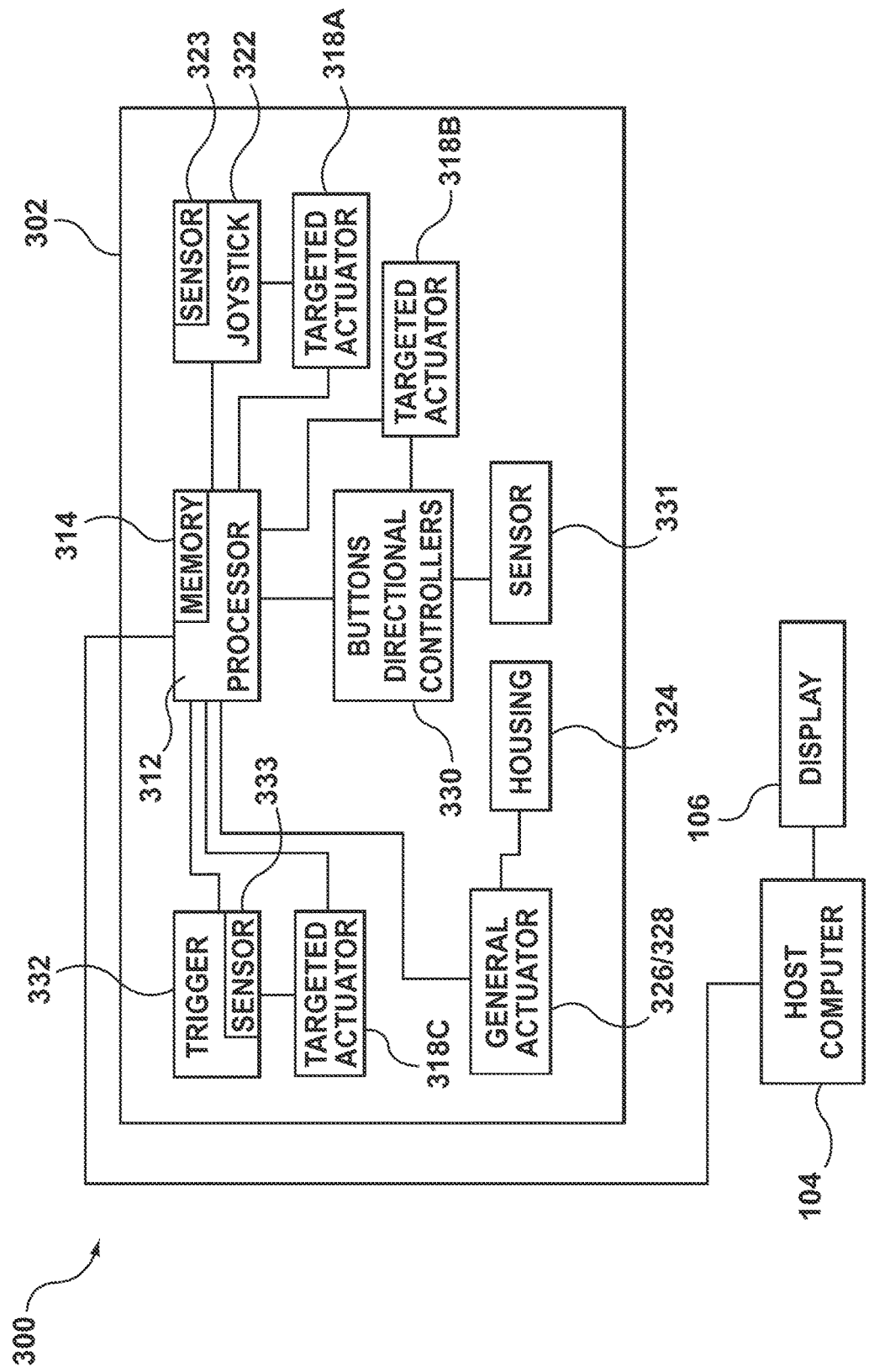
FIG. 5 illustrates a block diagram of the gaming controller of FIGS. 3 and 4.
Figure 6:
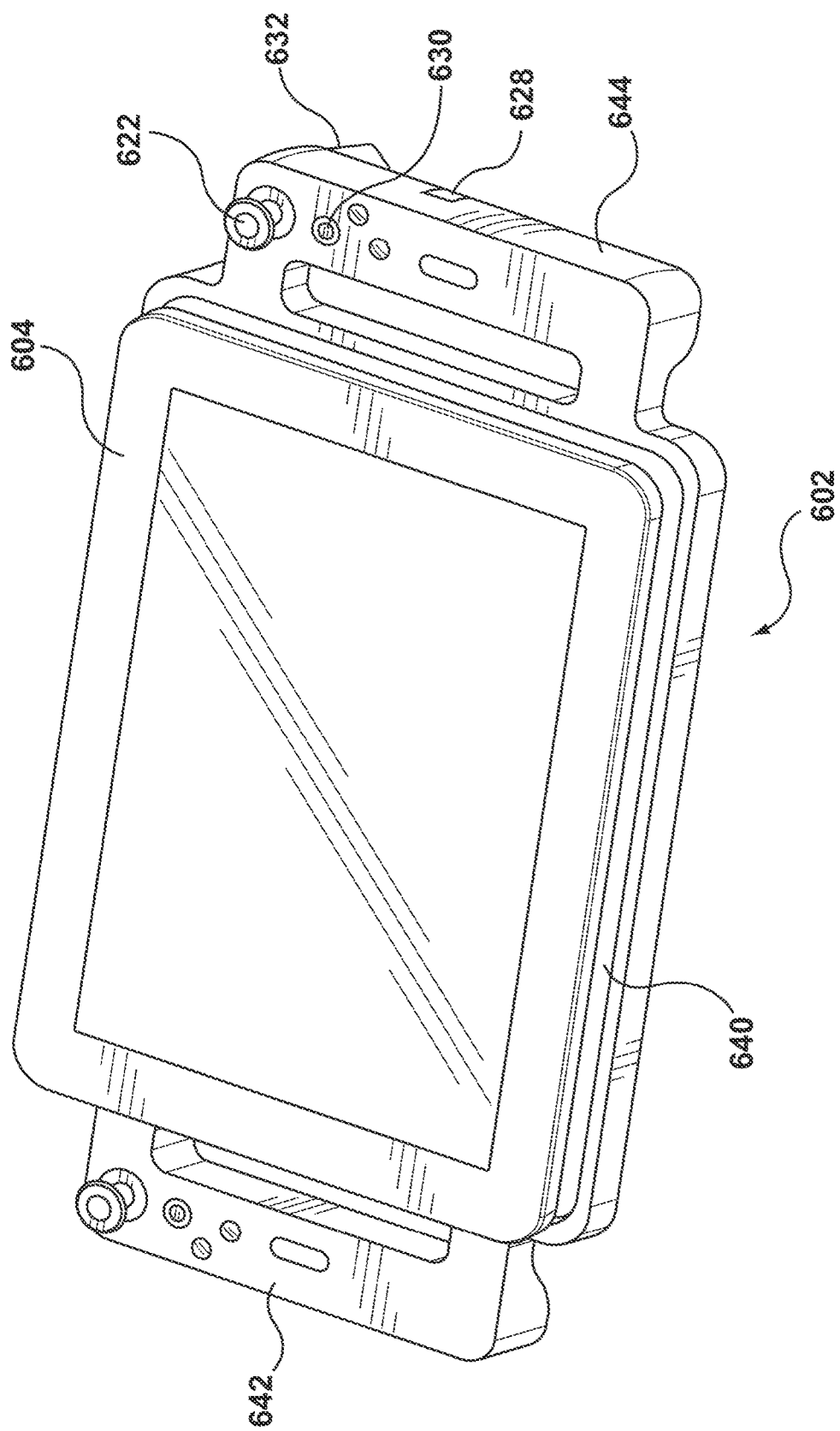
FIG. 6 is a perspective view of a system for providing haptic feedback to a haptic peripheral according to an embodiment hereof, wherein the haptic peripheral is a gaming tablet controller that may be used with a tablet computer.
Figure 7:
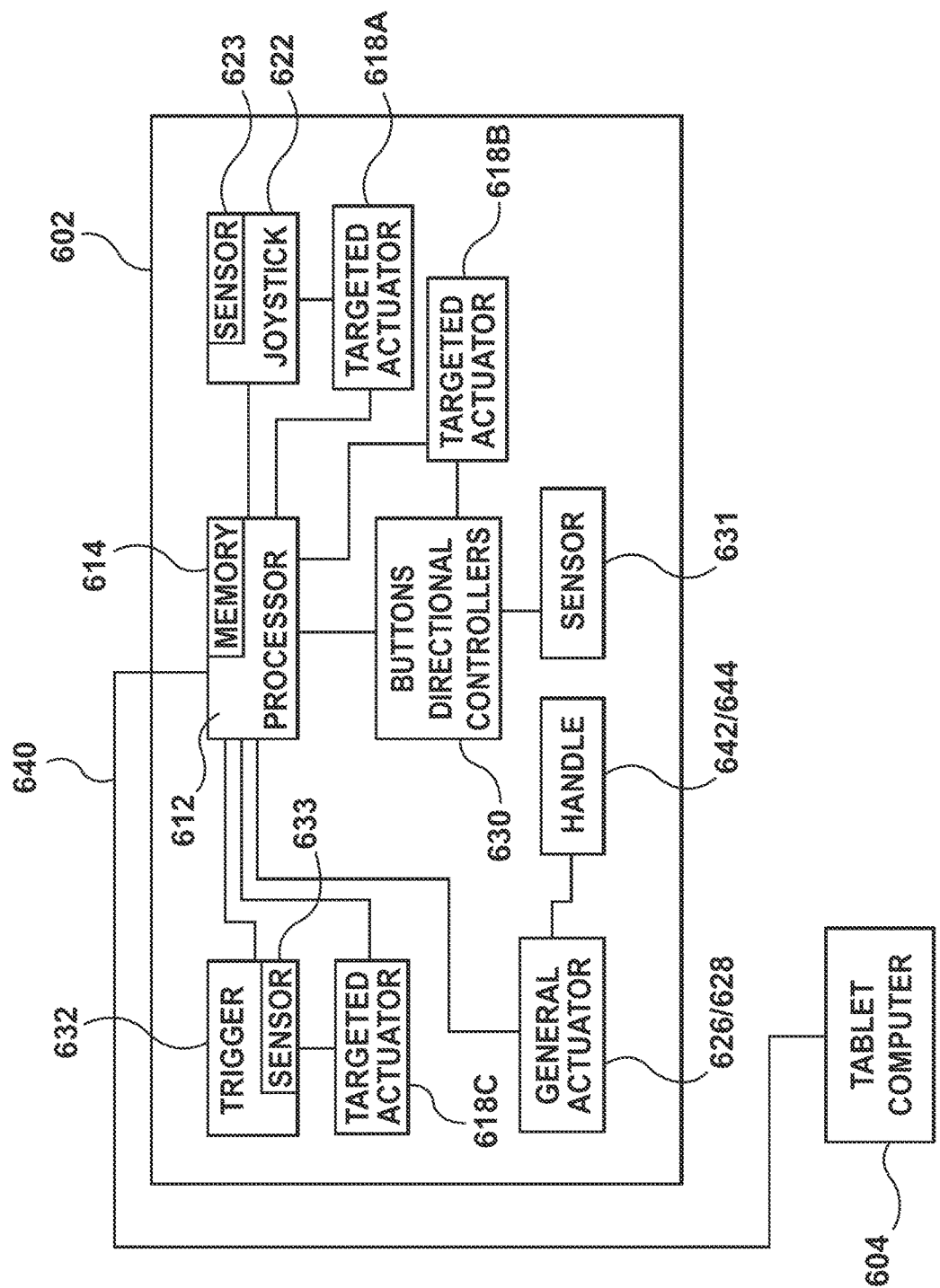
FIG. 7 illustrates a block diagram of the system of FIG. 6.

More particularly, FIG. 1 is a block diagram of a system 100 for providing haptic feedback to a haptic peripheral 102 according to an embodiment hereof and FIG. 2 is a schematic illustration of the system of FIG. 1. In the embodiment of FIGS. 1-2, haptic peripheral 102 is a haptic joystick with only a single manipulandum 122. However, those skilled in the art would recognize that the haptic joystick is merely an exemplary embodiment of a haptic peripheral and that haptic peripherals with other configurations, shapes, and sizes may be used. For example, as will be described in more detail herein, the haptic peripheral may be a handheld gaming controller 302 for a gaming system as shown in FIGS. 3-5 which is of similar shape and size to many "gamepads" currently available for video game console systems, a haptic peripheral 602 that may be used with a tablet computer 604 as shown in FIGS. 6-7, or other controllers that having user input (UI) elements such as, but not limited to, phones, personal digital assistants (PDA), tablets, computers, gaming peripherals, and other controllers for virtual reality systems known to those skilled in the art.

With reference to the embodiment of FIGS. 1-2, haptic peripheral 102 is in communication with a host computer or computer system 104 that is configured to generate a virtual environment to a user on a display 106. Host computer 104 may include a video game console, mobile device, or any other type of computer system that contains a processor configured to generate a virtual environment to a user on a display. As shown in the block diagram of FIG. 2, host computer 104 includes a host processor 108, a memory 110, and display 106. Host computer 104 executes a software application that is stored in memory 110 and is executed by host processor 108. Host processor 108 may be any type of general purpose processor, or could be a processor specifically designed to provide haptic effect signals. Host processor 108 may be the same processor that operates the entire host computer 104, or may be a separate processor. Host processor 108 can decide what haptic effects to send to haptic peripheral 102 and in what order to send the haptic effects. Memory 110 may be any type of storage device or computer-readable medium, such as but not limited to random access memory (RAM) or read-only memory (ROM). Memory 110 may also be located internal to the host processor, or any combination of internal and external memory.

Host computer 104 is coupled to display 106 via wired or wireless means. Display 106 may be any type of medium that provides graphical information to a user; this includes but is not limited to monitors, television screens, plasmas, LCDs, projectors, or any other display devices. In an embodiment, host computer 104 is a gaming device console and display 106 is a monitor which is coupled to the gaming device console, as known in the art. In another embodiment, as known to those skilled in the art, host computer 104 and display 106 may be combined into a single device.

In the embodiment shown in FIGS. 1-2, host computer 104 is in communication with haptic peripheral 102 through a wired or USB connection 103. However, in other embodiments, haptic peripheral 102 may communicate with host computer 104 using other wired communication or wireless communication means known to those of skill in the art. This can include but is not limited to a serial or Bluetooth connection.

As best shown in FIG. 2, haptic peripheral 102 includes a housing or base 120 and manipulandum or user input device 122 which can move in one or more degrees of freedom. Manipulandum 122 extends from housing 120. Although FIG. 2 illustrates a joystick as the manipulandum of the haptic peripheral, it will be understood by one of ordinary skill in the art that the present disclosure is not limited to a joystick manipulandum, but also includes any devices moveable in, either in whole or in part, one or more degrees of freedom. Those skilled in the art would recognize that the joystick is merely an exemplary embodiment of a manipulandum of a controller, and that manipulandums with other configurations such as triggers, buttons, or other user input elements may be used as will be described in more detail herein.

With additional reference to FIG. 1, haptic peripheral 102 includes a local processor 112, a local memory 114, a manipulandum sensor 123, and at least one actuator 118. Haptic peripheral 102 may also include a proximity sensor 116 and a perspective sensor 117, although such sensors are not required in all embodiments as will be described in more detail herein. Haptic peripheral 102 may be alternatively configured to not include local processor 112, whereby all input/output signals from haptic peripheral 102 are handled and processed directly by host computer 104. As will be explained in more detail herein, local processor 112 is coupled to actuator 118 to provide haptic effects thereto based on high level supervisory or streaming commands from host computer 104. Similar to host processor 108, local processor 112 also can decide what haptic effects to send and what order to send the haptic effects. In addition, if haptic peripheral 102 includes more than one actuator, local processor 112 can decide which actuator will receive the haptic effect signal. In addition, similar to memory 110 of host computer 104, local memory 114 that can be any type of storage device or computer-readable medium, such as but not limited to random access memory (RAM) or read-only memory (ROM). Local memory 114 may also be located internal to the local processor, or any combination of internal and external memory.

As stated above, manipulandum 122 of haptic peripheral 102 may be physically moved within one or more degrees of freedom. For example, a user may move the manipulandum 122 forward, backwards, left or right. When a user moves manipulandum 122, manipulandum sensor 123 detects the movement and/or position of the manipulandum and transmits a sensor signal to local processor 112. Local processor 112 then communicates or transmits the sensor signal to host computer 104. Based on the received sensor signal, host computer 104 performs actions within the video game and updates the virtual environment. Stated another way, the movement of manipulandum 122 of haptic peripheral 102 represents inputs from the user which allows the user to interact with the software applications running on host computer 104, including but not limited to video games relating to first person shooter, third person character interaction, vehicle related games, or computer simulations. The movement of manipulandum 122 may provide host computer 104 with input corresponding to the movement of a computer generated graphical object, such as a cursor or other image, or some other graphical object displayed by the host computer 104 via display 106, or to control a virtual character or gaming avatar, such as a person, vehicle, or some other entity that may be found in a game or computer simulation.

In addition to receiving sensor signals from manipulandum sensor 123, local processor 112 also receives high level supervisory or streaming commands from host computer 104 relating to haptic effects to be output from actuator 118. Local processor 112 then provides control or drive signals to actuator 118 based on the high level supervisory or streaming commands from host computer 104. For example, when in operation, voltage magnitudes and durations are streamed from host computer 104 to haptic peripheral 102 where information is provided to actuator 118 via local processor 112. Host computer 104 may provide high level commands to local processor 112 such as the type of haptic effect to be output (e.g. vibration, jolt, detent, pop, etc.) by actuator 118, whereby the local processor 112 instructs actuator 118 as to particular characteristics of the haptic effect which is to be output (e.g. magnitude, frequency, duration, etc.). Local processor 112 may retrieve the type, magnitude, frequency, duration, or other characteristics of the haptic effect from local memory 114 coupled thereto. Depending on game actions and control signals received from host computer 104, local processor 112 may send a control or drive signal to actuator 118 to output one of a wide variety of haptic effects or sensations, including vibrations, detents, textures, jolts or pops.

Actuator 118 may be an inertial or kinesthetic actuator as known to those of ordinary skill in the art of virtual reality systems. Possible actuators include but are not limited to eccentric rotating mass ("ERM") actuators in which an eccentric mass is moved by a motor, linear resonant actuators ("LRAs") in which a mass attached to a spring is driven back and forth, piezoelectric actuators, electromagnetic motors in which an eccentric mass is moved by a motor, vibrotactile actuators, inertial actuators, shape memory alloys, electro-active polymers that deform in response to signals, mechanisms for changing stiffness, electrostatic friction (ESF), ultrasonic surface friction (USF), or other suitable types of actuating devices. In another embodiment, the actuator may use kinesthetic haptic feedback including, for example, solenoids to change the stiffness/damping of manipulandum 122 and/or housing 120, small air bags that change size in manipulandum 122 and/or housing 120, or shape changing materials.

As previously stated, haptic peripheral 102 is merely an exemplary embodiment of a haptic peripheral and that haptic peripherals with other configurations, shapes, and sizes may be used. For example, FIGS. 3-5 illustrate another embodiment of a haptic peripheral 302 that may be utilized in embodiments hereof. FIGS. 3 and 4 are different perspective views of haptic peripheral 302, wherein the haptic peripheral is a handheld gaming controller, while FIG. 5 illustrates a block diagram of haptic peripheral 302 used in a gaming system 300 that further includes a host computer 104 and a display 106. A housing 324 of haptic peripheral 302 is shaped to easily accommodate two hands gripping the device, either by a left-handed user or a right-handed user. Those skilled in the art would recognize that haptic peripheral 302 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, an Xbox™ controller or similar controller, as well as controllers shaped as real life objects (such as tennis rackets, golf clubs, baseball bats, and the like) and other shapes.

Haptic peripheral 302 includes several user input elements or manipulandums, including a joystick 322, a button 330, and a trigger 332. As used herein, user input element refers to an interface device such as a trigger, button, joystick, or the like, which is manipulated by the user to interact with host computer 104. As can be seen in FIGS. 3-4 and known to those skilled in the art, more than one of each user input element and additional user input elements may be included on haptic peripheral 302. Accordingly, the present description of a trigger 332, for example, does not limit haptic peripheral 302 to a single trigger. Further, the block diagram of FIG. 5 shows only one (1) of each of joystick 322, button 330, and trigger 332. However, those skilled in the art would understand that multiple joysticks, buttons, and triggers, as well as other user input elements, may be used, as described above.

As can be seen in the block diagram of FIG. 5, haptic peripheral 302 includes a targeted actuator or motor to directly drive each of the user input elements thereof as well as one or more general or rumble actuators 326, 328 coupled to housing 324 in a location where a hand of the user is generally located. More particularly, joystick 322 includes a targeted actuator or motor 318A coupled thereto, button 330 includes a targeted actuator or motor 318B coupled thereto, and trigger 332 includes a targeted actuator or motor 318C coupled thereto. In addition to a plurality of targeted actuators, haptic peripheral 302 includes a position sensor coupled to each of the user input elements thereof. More particularly, joystick 322 includes a position sensor 323 coupled thereto, button 330 includes a position sensor 331 coupled thereto, and trigger 332 includes a position sensor 333 coupled thereto. Local processor 312 is coupled to targeted actuators 318A, 318B, 318C as well as position sensors 323, 331, 333 of joystick 322, button 330, and trigger 332, respectively. In response to signals received from position sensors 323, 331, 333, local processor 312 instructs targeted actuators 318A, 318B, 318C to provide directed or targeted effects directly to joystick 322, button 330, and trigger 332, respectively. Such targeted effects are discernible or distinguishable from general or rumble haptic effects produced by general actuators 326, 328 along the entire body of the controller. The collective haptic effects provide the user with a greater sense of immersion to the game as multiple modalities are being simultaneously engaged, e.g., video, audio, and haptics. Similar to haptic peripheral 102 and host computer 104, haptic peripheral 302 is coupled to and communicates with host computer 104 having a display 106. Local processor 312 of haptic peripheral 302 is coupled to each actuator to provide haptic effects thereto based on high level supervisory or streaming commands from host computer 104. The actuators of haptic peripheral 302 may be any type of actuator listed herein for actuator 118 of haptic peripheral 102. Haptic peripheral 302 may also include a proximity sensor (not shown) similar to proximity sensor 116, and/or a perspective sensor (not shown) similar to perspective sensor 117, although sensors are not required in all embodiments as will be described in more detail herein.

FIGS. 6-7 illustrate a haptic peripheral 602 according to another embodiment hereof in which haptic peripheral 602 is a gaming tablet controller that may be used with a tablet computer 604. Tablet computer 604 may be designed specifically for gaming activities, such as is available from Razer Inc., or may be a tablet computer well known and available in the market, such as an Apple® Ipad®, Kindle®

Fire®, and Samsung® Galaxy Tab®. Haptic peripheral 602 includes a docking portion 640 configured to receive tablet computer 604 and handles 642, 644 with manipulandums disposed thereon for a user to control a game on tablet computer 604. Docking portion 640 connects haptic peripheral 602 to tablet computer 604 such that actions by the user on handles 642, 644, such as pressing buttons, moving joysticks, pressing triggers, etc., result in actions on the game being played on tablet computer 604.

Handles 642, 644 include typical manipulandums or user input elements found on controllers. The manipulandums will be described with respect to handle 644. However, those skilled in the art would recognize that the same or similar manipulandums may be used on handle 642. In particular, handle 644 includes a joystick 622, a button 630, and a trigger 632. As can be seen in FIG. 6 and known to those skilled in the art, more than one of each of these user input elements may be included on each handle 642, 644. Further, handles 642, 644 include general or rumble actuators 626, 628 attached thereto in a location where hands of the user are generally located for providing general or rumble haptic effects to handles 642, 644 as described above with respect to general or rumble actuators 326, 328.

As shown in the block diagram of FIG. 7, haptic peripheral 602 includes a local processor 612 which communicates with tablet computer 604 via docking portion 640. The block diagram of FIG. 7 shows only one (1) of each of joystick 622, button 630, and trigger 632. However, those skilled in the art would understand that multiple joysticks, buttons, and triggers, as well as other user input elements, may be used, as described above. Local processor 612 is coupled to targeted actuators 618A, 618B, 618C as well as position sensors 623, 631, 633 of joystick 622, button 630, and trigger 632, respectively. In response to signals received from position sensors 623, 631, 633, local processor 612 instructs targeted actuators 618A, 618B, 618C to provide directed or targeted effects directly to joystick 622, button 630, and trigger 632, respectively. Local processor 612 of haptic peripheral 602 is coupled to each actuator to provide haptic effects thereto based on high level supervisory or streaming commands from host computer 604. The actuators of haptic peripheral 602 may be any type of actuator listed herein for actuator 118 of haptic peripheral 102. Haptic peripheral 602 may also include a proximity sensor (not shown) similar to proximity sensor 116, although such a sensor is not required in all embodiments as will be described in more detail herein.

Regardless of which haptic peripheral configuration or embodiment is utilized, host processor 108 and/or local processor 112 is configured to vary the control signal for the actuator depending on a zoom state of a virtual camera. Stated another way, processor 108 and/or local processor 112 is configured to vary or modify the control signal for actuator 118 depending on a virtual distance within the virtual environment between a virtual camera and a virtual object that is a source or cause of a haptic effect. For example, weaker haptic effects are played or output when the virtual object is further away from the virtual camera, i.e., a first zoom state, and stronger haptic effects are played or output when the virtual object is closer to the virtual camera, i.e., a second zoom state in which the virtual object appears or is perceived by the user to be larger and/or closer. For sake of illustration, exemplary zoom states of a virtual camera are described herein with reference to virtual distances within the virtual environment between the virtual camera and the virtual object. However, as will be understood by those of ordinary skill in the art of virtual environments, the change in virtual distances is simulated or computer-generated and does not include physical movement of a virtual camera (as the virtual camera itself is simulated or computer-generated rather than a physical camera). Further, although described with reference to system 100 and haptic peripheral 102, it will be understood by those of ordinary skill in the art that the host processor and/or local processor of the embodiment of FIGS. 3-5 and the embodiment of FIGS. 6-7 are also configured to configured to vary the control signal for the respective actuators depending on a virtual distance within the virtual environment between a virtual camera and a virtual object.

Virtual distances will be explained in more detail with reference to FIGS. 8-11. FIG. 8 is an illustration of display 106, wherein the display displays a virtual object 852 thereon. FIG. 8 may also be considered to illustrate a first zoom state of virtual camera 850. In this example, virtual object 852 is a car but it will be understood by those of ordinary skill in the art that the virtual object may be any object or event displayed in a virtual reality environment. The virtual object is a source or cause of a haptic effect such that haptic effects relating to the virtual object are generated or played to the user. Further, a virtual object may include one or more sources or causes of haptic effects. For example, if the virtual object is a car, the car as a whole may generate a first haptic effect while a specific point on the car such as a tire may generate a second or different haptic effect. FIG. 9 is a schematic illustration of a first virtual distance $D_1$ between a virtual camera 850 of system 100 and virtual object 852. "Virtual camera" as used herein refers to the mechanism within the processor software that captures the field of view for the virtual environment. The virtual camera is a function of the processor software that works and behaves in the same way a camera or digital camera would in real-world situations. In the software, the virtual camera is made up from mathematical calculations that determine how a virtual object will be rendered based on the location and angle of the virtual camera in the software program. As with a real camera, when working with a virtual camera in virtual reality programs, a user may use functions like pan, zoom, or change focus and focal points.

FIG. 10 is also an illustration of display 106, wherein the display displays a virtual object 852 thereon, and FIG. 11 is a schematic illustration of a second virtual distance $D_2$ between virtual camera 850 of system 100 and virtual object 852. FIG. 10 may also be considered to illustrate a second zoom state of virtual camera 850 in which virtual object 852 appears larger and/or closer to the user as compared to the first zoom state of virtual camera 850 depicted in FIG. 8. As can be seen from a comparison of first virtual distance $D_1$ and second virtual distance $D_2$, first virtual distance $D_1$ is greater or longer than second virtual distance $D_2$ and virtual object 852 appears smaller and further away in FIG. 8 than in FIG. 10. First virtual distance $D_1$ between virtual camera 850 and virtual object 852 results in actuator 118 generating and applying a first haptic effect and a second virtual distance $D_2$ between virtual camera 850 and virtual object 852 results in actuator 118 generating and applying a second haptic effect. In an embodiment, the first haptic effect is weaker than the second haptic effect. Stated another way, relatively weaker haptic effects are output when the distance between virtual camera 850 and virtual object 852 is relatively long while relatively stronger haptic effects are output when the distance between virtual camera 850 and virtual object 852 is relatively short. Modifying the haptic effects based on the proximity of virtual object 852 provide the user with a greater sense of immersion to the game. For example, as virtual object 852 moves from a far-away position such as that shown in FIG. 8 to a nearby or close position such as that shown in FIG. 10, the associated haptic effects may gradually increase to simulate the feeling the Doppler effect of virtual object 852 moving towards the viewer. In another example, virtual object 852 may include an event taking place within the virtual environment such as an explosion and the associated haptic effect may include vibrations. If the explosion takes place at a far-away position such as that shown in FIG. 8, such associated vibrations are relatively weak to simulate the feeling of experiencing an explosion from a far-away or distant location. If the explosion takes place at a close or nearby position such as that shown in FIG. 10, such associated vibrations are relatively strong to simulate the feeling of experiencing an explosion from a close or nearby location.

Virtual distances such as first virtual distance $D_1$ and second virtual distance $D_2$ may be detected or calculated in one of several ways. In certain embodiments hereof, virtual distances may be detected via proximity sensor 116. Proximity sensor 116 detects actions of the user by detecting distance changes between haptic peripheral 102 and host computer 104. More particularly, in an embodiment, proximity sensor 116 is configured to detect an actual distance between haptic peripheral 102 and host computer 104 and is also configured to send the actual distance to host processor 108 and/or local processor 112. Based on changes of the detected actual distance between haptic peripheral 102 and host computer 104, host processor 108 and/or local processor 112 creates movements between virtual camera 850 and virtual object 852 and thereby changes the virtual distance between virtual camera 850 and virtual object 852. When the actual distance between haptic peripheral 102 and host computer 104 changes, there is an associated or related change in the virtual distance between virtual camera 850 and virtual object 852. For example, if the user (and thus haptic peripheral 102 held by or coupled to the user) moves closer to host computer 104, proximity sensor 116 detects such movement as a decreased actual distance between haptic peripheral 102 and host computer 104 and, as a result thereof, host processor 108 and/or local processor 112 decreases the virtual distance between virtual camera 850 and virtual object 852. In addition, proximity sensor 116 may be configured to determine the edges of objects, physically and virtually, and the points in which they might make contact with each other. Examples for proximity sensor 116 include but are not limited to laser sensors, ultrasound sensors, optical sensors, depth sensors, sensors employed in Near Field Communications (NFC) or Bluetooth 4.0, in which devices have a limited area of awareness in each other, and other distance or measurement sensors known in the art. For example, in an embodiment, proximity sensors 116 may be located in two separate or independent hand-held haptic peripherals, such as two Wii controllers or two Razor Hydra/Sixense STEM devices, and haptic effects may change based on how far apart the two hand-held haptic peripherals are held by the user, as well as the distance between the hand-held haptic peripherals and a mounted proximity sensor of the system, such as a sensor mounted on a display device or other associated peripheral such as a charging station. Thus, proximity sensor 116 may be located within or physically coupled to haptic peripheral 102 as shown in FIG. 1. Alternatively, proximity sensor may be located within host computer 104 or may be a separate/independent sensor device that is remote from both host computer 104 and haptic peripheral 102. In an embodiment hereof, proximity sensor 116 is a wearable sensor device configured to be coupled to the user or is a sensor device attached to a wearable haptic peripheral. Further, in an embodiment hereof, proximity sensor 116 is a head-mounted sensor device configured to be coupled to the user or is a sensor device attached to a head-mounted haptic peripheral.

In another embodiment hereof, proximity sensor 116 is configured to detect a user movement and is also configured to send the user movement to host processor 108 and/or local processor 112. Based on the detected or sensed user movement, host processor 108 and/or local processor 112 creates movements between virtual camera 850 and virtual object 852 and thereby changes the virtual distance between virtual camera 850 and virtual object 852 as described in the paragraph above. Stated another way, the detected or sensed user movement is reflected in the virtual reality environment via host processor 108 and/or local processor 112. Examples for proximity sensor 116 in this embodiment include but are not limited to video camera devices, webcam devices, sensors that detect the presence of nearby objects without any physical contact, motion sensors, sensors applied to a user's skin that detect muscle movements to determine user's motions, infra-red sensors, ultrasonic sensors, near field transmission, stereo triangulation, coded aperture, interferometry, or any other range imaging sensor, such as devices like the XBOX Kinect. Although described with a single proximity sensor, it will be understood by one of ordinary skill in the art that multiple sensors may be utilized simultaneously or in conjunction in order to determine a user's motions. For example, a sensor system may be located within a television, monitor, or Kinect accessory to capture a real-time 3D image of the user in a space using multiple sensors. The sensor system also is configured to identify faces using a webcam, as well as points of interaction with the user such as the hands of the user and with other objects such as the haptic peripherals. The sensor system uses this information to determine user position relative to the system and/or peripherals and to determine the position of the peripherals relative to the user and/or system. Intelligent sensors located in the objects also enable awareness of each other such that sensors within the peripheral (such as gyroscope, accelerometer, etc.) will additionally inform the orientation and location of these peripherals.

In yet another embodiment, virtual distances may be detected without the use of proximity sensor 116 (and thus proximity sensor 116 is not required in this embodiment). More particularly, virtual distances are detected by host processor 108 and/or local processor 112 detecting a change of state within the virtual environment. For example, a user may operate manipulandum 122 to move a character within the virtual environment, thereby changing the virtual distance between the character and virtual object 852. Movement of the character may be detected as a change in state by host processor 108 and/or local processor 112, and the associated haptic effects may be varied or modified depending on the change in virtual distance.

Although FIGS. 8-11 illustrate video game examples, a virtual reality environment may include various types of content including but not limited to live or broadcast footage or a pre-recorded or authored content track. For example, a virtual reality environment may include 2D or 3D content and may simulate a user or viewer being present in a remote location of the world (i.e., for educational or recreational purposes), may simulate a user or viewer being present at an event (i.e., a sports game, music concert, or theatrical play), or may simulate a user or viewer being present within a fantasy or historical environment. If the virtual reality environment includes 3D content, the simulation is 360 degrees such that when a user turns or rotates, he or she sees the virtual environment surrounding them. From a video and audio standpoint, a multi-channel video system may be used with actual camera footage filmed or created from various circumferential or wrap-around views and software stitches clips together to create a seamless video/audio virtual reality experience. In these non-video game embodiments, at least one haptic peripheral is required for receiving haptic feedback. However, the haptic peripheral does not require a manipulandum or a manipulandum sensor if interaction/interfacing with the virtual environment is not permitted. Essentially, if interaction/interfacing with the virtual environment is not permitted or desired, the haptic peripheral is only required to include at least one actuator for outputting haptic effects and may include a local memory and/or a local processor as described herein.

Modifying haptic effects based on a zoom state of a virtual camera with respect to a virtual object that is a source or cause of a haptic effect is quite desirable in the non-video game embodiments described in the previous paragraph. More particularly, in the example that the virtual reality environment simulates a user or viewer being present at an event (i.e., a sports game, music concert, or theatrical play), the haptic effects output to the haptic peripheral will vary based on the user's location within the virtual reality environment. When the user or viewer (and thus the virtual camera) is located close or nearby to the simulated event (i.e., the virtual object that is a source or cause of a haptic effect), the haptic effects output to the haptic peripheral will be stronger than if the user or viewer (and thus the virtual camera) is located far away from the simulated event. For example, if the simulated event is a rock concert, stronger vibrations may be output to the haptic peripheral when the user or viewer (and thus the virtual camera) is located in a row or section close to the stage compared to when the user or viewer (and thus the virtual camera) is located in a row or section far away from the stage. Similarly, if the simulated event is a sports event such as a basketball game, stronger vibrations may be output to the haptic peripheral when the user or viewer (and thus the virtual camera) is located in a row or section close to the basketball court compared to when the user or viewer (and thus the virtual camera) is located in a row or section far away from the basketball court.

In the non-video game embodiments described above, detection of the virtual distance between the virtual camera and the virtual object (i.e., a sports game, music concert, or theatrical play that is a source or cause of a haptic effect) preferably utilizes multiple proximity sensors as well as multiple haptic peripherals that are coupled to or worn by the user. As described above with respect to proximity sensor 116, such proximity sensors may be distance or measurement sensors known in the art and/or camera devices or motion sensors known in the art. The proximity sensors would detect actual movement by the user such that the movement is reflected in the virtual reality environment. As the user (and virtual camera associated therewith) moves, the haptic effects output by the haptic peripherals may automatically update or vary in a seamless manner according to user-initiated position changes. Each haptic peripheral may be considered a haptic channel, and outputting haptic effects to a particular haptic peripheral may be considered haptic channel selection. A host computer detects user movements, which thereby result in position changes of the virtual camera. As a result of the position changes of the virtual camera and changes in the haptic effects associated therewith, the host computer outputs various haptic effects to particular haptic peripherals in a sequential and/or simultaneous manner in order to achieve seamless gesture-based haptic channel selection. Such haptic channel selection may include interpolation of the haptic channel selection. More particularly, an interpolation system acts as a haptic mixer. Multiple objects in a 3D environment will act as haptic emitters, similar to the way in which multiple objects in the real or virtual world are audio emitters. The interpolation system uses the data available from sensors (i.e., user's position, orientation, objects of interactivity, camera view) and properties of the environment (i.e., type and strength of effects, parameters of what to do when interacted with while in view, interacted with while out of camera frame, in view but not interacted with, etc.) to determine automatically what haptic sensations to prioritize and what, if any, filters or modulation to apply to the effects.

Figure 12:
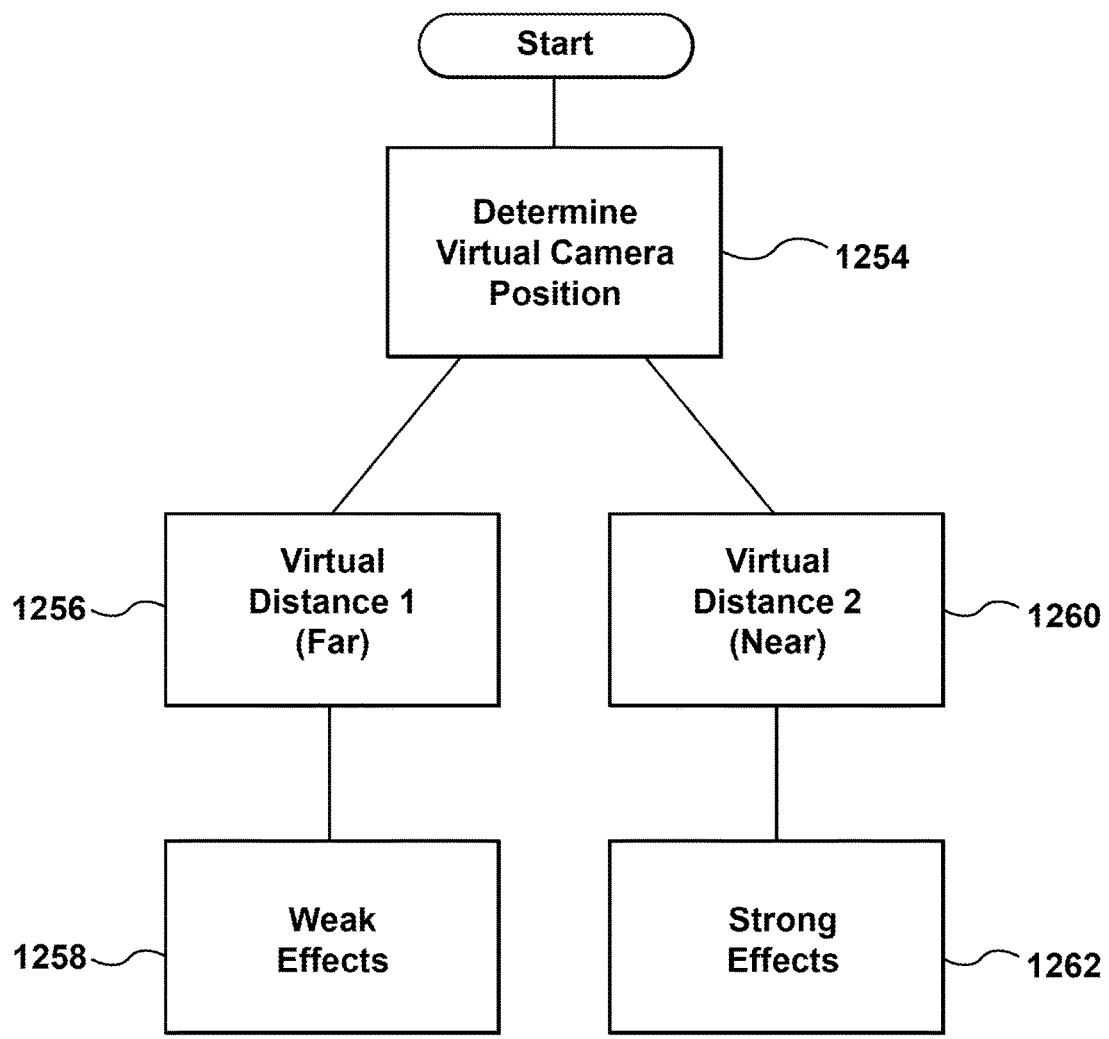
FIG. 12 is a flow chart illustrating a method for providing haptic effects to a user of a haptic peripheral according to an embodiment hereof, wherein the rendered haptic effects vary depending upon the position or distance of a virtual camera relative to a virtual object that is a source or cause of a haptic effect.

FIG. 12 is a flow chart illustrating a method for providing haptic effects to a user of a haptic peripheral according to an embodiment hereof, wherein the rendered haptic effects vary depending upon the zoom state of virtual camera 850 as described above. In an embodiment, the functionality of the flow diagram of FIG. 12 is implemented by software stored in host memory 110 of host component 104 and executed by host processor 108, and/or local memory 114 of haptic peripheral 102 and executed by local processor 112. In other embodiments, the functionality may be performed by hardware through the use of an application specific integrated circuit ("ASIC"), a programmable gate array ("PGA"), a field programmable gate array ("FPGA"), or any combination of hardware and software.

At step 1254, host processor 108 and/or local processor 112 determines the position or location of virtual camera 850 with respect to virtual object 852 that is a source or cause of a haptic effect. In determining the position of virtual camera 850, host processor 108 and/or local processor 112 determines the virtual distance between virtual camera 850 and virtual object 852. At step 1256, a first virtual distance $D_1$ between virtual camera 850 and virtual object 852 is relatively long and results in actuator 118 generating and applying weak haptic effects at step 1258. At step 1260, a second virtual distance $D_2$ between virtual camera 850 and virtual object 852 is relatively short and results in actuator 118 generating and applying strong haptic effects at step 1262. For sake of illustration only, the method of FIG. 12 describes the virtual distance as either a first virtual distance $D_1$ (in which virtual object 852 is relatively far away from virtual camera 850) or a second virtual distance $D_2$ (in which virtual object 852 is relatively close or nearby virtual camera 850). However, it will be understood by those of ordinary skill in the art that the virtual distance between virtual camera 850 and virtual object 852 may include any number of possible distances, each of which may have an associated strength of haptic effects.

The haptic effects that are output by actuator 118 can include but are not limited to varying degrees of vibrations, varying degrees of detents, or other types of haptic effects. As an illustrative example, if a user is controlling a character or some other graphical object and then encounters an explosion in the virtual environment, the associated haptic effect might be a vibration. In this case, local processor 112 receives a signal indicating that haptic peripheral 102 should vibrate with a strength that varies depending on the proximity of the explosion to the character or other graphical object in the game. As a result, local processor 112 sends the signal to actuator 118 to provide the appropriate haptic effect, which in this example is a vibration with a particular strength that depends on the virtual distance between virtual camera 850 and virtual object 852. In determining the type of haptic effects to be executed and provided to the user, high level haptic parameters or streaming values are generated in the software code and sent to a haptic engine (not shown) where they are processed and the appropriate voltage levels are generated for the actuators. This allows the haptic peripheral to provide the appropriate haptic feedback to the user and vary the amount or type of haptic feedback through the different voltage levels that are generated for the actuators. In addition, the gaming software and the haptic software can reside on the same processor or on multiple processors.

Figure 13:
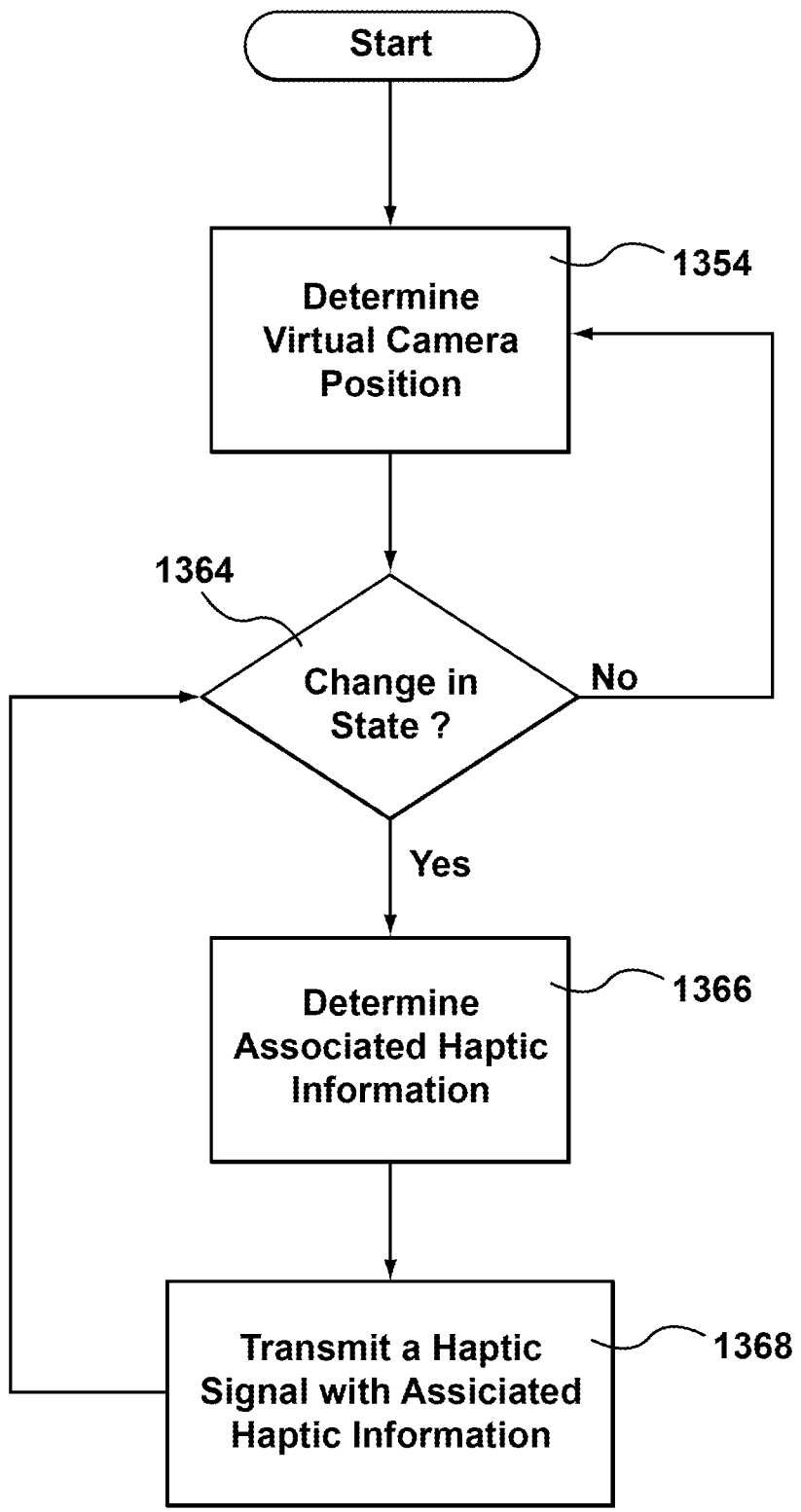
FIG. 13 is a flow chart illustrating a method for determining and transmitting a haptic signal from a host device according to an embodiment hereof, wherein the rendered haptic effects vary depending upon the position or distance of a virtual camera relative to a virtual object that is a source or cause of a haptic effect.

FIG. 13 is a flow chart illustrating a method for determining and transmitting a haptic signal from a host computer according to an embodiment hereof, wherein the rendered haptic effects vary depending upon virtual camera position. In an embodiment, the functionality of the flow diagram of FIG. 13 is implemented by software stored in memory 110 of host component 104 and executed by host processor 108, and/or memory 110 of haptic peripheral 102 and executed by local processor 112. In other embodiments, the functionality may be performed by hardware through the use of an application specific integrated circuit ("ASIC"), a programmable gate array ("PGA"), a field programmable gate array ("FPGA"), or any combination of hardware and software.

At step 1354, host processor 108 and/or local processor 112 determines the position or location of virtual camera 850 with respect to virtual object 852 that is a source or cause of a haptic effect. In determining the position of virtual camera 850, host processor 108 and/or local processor 112 determines the virtual distance between virtual camera 850 and virtual object 852.

At step 1364, host processor 108 determines whether there is a change in state. In one embodiment, this change can be a change in a virtual space for a game or a simulation. As an example, a user could be moving a character or some other graphical object and then encounters an explosion in the virtual environment. The character movement and/or encountering the explosion (or other virtual object that is a source or cause of a haptic effect) may be a change in state. One of ordinary skill in the art would understand that changes in state are not limited to the example stated above.

At step 1366, host processor 108 then determines the associated haptic effect with the change in state. For example, in the scenario of a user controlling a virtual character and that character encountering with a virtual object such as an explosion, such an encounter could have an associated haptic effect, such as a vibration. As described above, the associated haptic effects vary depending upon virtual camera position. Relatively weaker haptic effects are output when the distance between virtual camera 850 and virtual object 852 is relatively long while relatively stronger haptic effects are output when the distance between virtual camera 850 and virtual object 852 is relatively short. If the explosion takes place at a far-away position, such associated vibrations are relatively weak to simulate the feeling of experiencing an explosion from a far-away location. If the explosion takes place at a close or nearby position, such associated vibrations are relatively strong to simulate the feeling of experiencing an explosion from a close or nearby location.

The process of determining whether there is an associated haptic effect with the change of state can be done in a multiple ways. If it is determined that the change of state has an associated haptic effect, then a haptic signal will be sent. If it is determined that the change of state does not have an associated haptic effect, then no haptic signal will be sent. In one embodiment, host computer 104 accesses a pre-defined mapping of change of state and haptic effects. For example, the host processor may determine that the change of state exists (i.e., the virtual camera is close to the virtual object), and that the associated haptic effect is to strengthen effects associated with the virtual object. The associated haptic effects for this change of state may be determined according to a pre-defined mapping system employed by the host processor and/or the local processor. For example, the pre-defined mapping system may dictate that a particular content track or sequence of authored haptic effects be played depending upon the detected virtual distance. In another embodiment, the pre-defined mapping system may dictate that a currently playing content track or sequence of authored haptic effects be modified or varied depending upon the detected virtual distance. For example, the haptic effects being output according to the currently playing content track may gradually strengthen or strengthen to a predetermined level for a predetermined amount of time. As such, the haptic volume is increased or haptic emphasis is placed on the virtual object due to the detected proximity between the virtual camera and the virtual object. It will be apparent to one of ordinary skill in the art that the above examples of pre-defined mapping systems are exemplary in nature and any pre-defined mapping system may be utilized as desired by the developer of the virtual environment.

At step 1368, host computer 104 transmits the haptic information to haptic peripheral 102 using a haptic or control signal with the associated haptic information. The transmission of the haptic information can be done either through wired or wireless communication, as previously described. Local processor 112 of haptic peripheral 102 thus receives the control signal indicating that haptic peripheral 102 should vibrate with a strength that varies depending on the proximity of the explosion to the character or other graphical object in the game.

Embodiments described above relate to modifying haptic effects based on a zoom state of a virtual camera with respect to a virtual object that is a source or cause of a haptic effect. Alternatively and/or in addition, embodiments hereto may include modifying haptic effects based on a perspective of the virtual camera. In a video game embodiment, wherein the video game or host computer permits a first-person point-of-view or perspective and a third-person point of view or perspective, then the haptic effects would vary depending on the current perspective or point-of-view of the user. For example, trigger haptic effects are output or emphasized when the virtual camera is in a first-person point-of-view or perspective and ambient haptic effects are output or emphasized when the virtual camera is in a third-person point-of-view or perspective. As such, the haptic volume is increased or haptic emphasis is placed on either the trigger effects or the ambient effects due to the detected perspective of the virtual camera. Although described with reference to system 300 and haptic peripheral 302, it will be understood by those of ordinary skill in the art that the host processor and/or local processor of the embodiment of FIGS. 1-2 and the embodiment of FIGS. 6-7 are also configured to configured to vary the control signal for the respective actuators depending on a perspective of the virtual camera.

Figure 14:
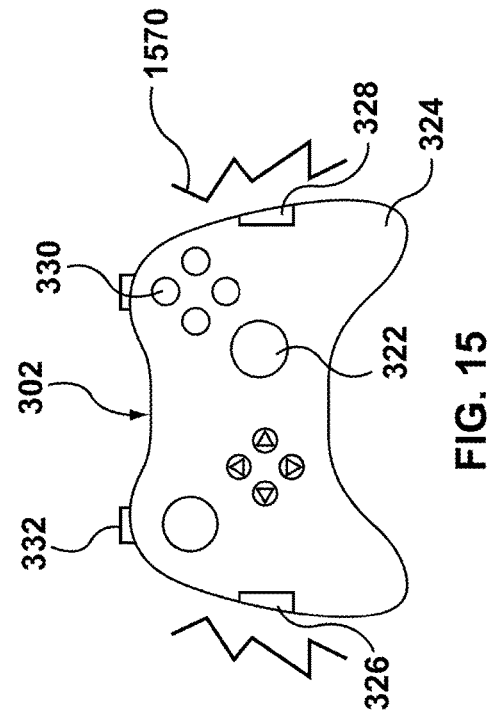
FIG. 14 is an illustration of a third person virtual camera perspective in a video game embodiment.
Figure 15:
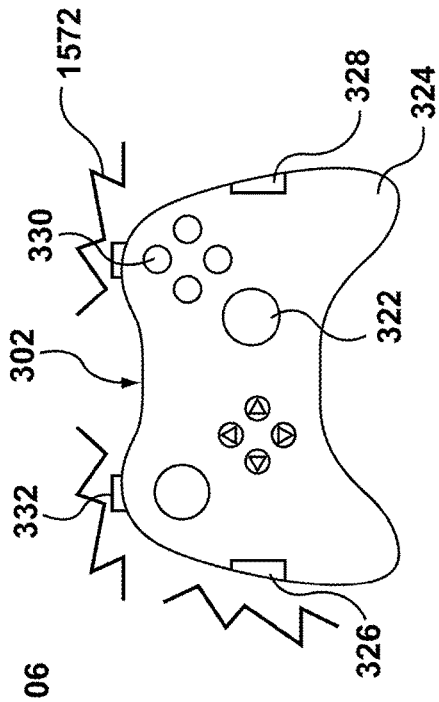
FIG. 15 is an illustration of a haptic peripheral according to an embodiment hereof, wherein the haptic peripheral is a handheld gaming controller and weak and/or ambient haptic feedback is provided to the haptic peripheral when the user is in the third person virtual camera perspective as shown in FIG. 14.

FIG. 14 is an illustration of display 106, wherein the display displays a combat warfare video game thereon in a third-person point-of-view or perspective. In this example a video game is displayed but it will be understood by those of ordinary skill in the art that any type of virtual reality environment may be displayed. FIG. 15 is a schematic illustration of haptic peripheral 302 of system 300 described above, which is operated by a user to interact with display 106 of FIG. 14. As used herein, third-person point-of-view or perspective refers to a graphical perspective rendered from a fixed distance behind and slightly above the user's virtual character. Users may view the entire virtual environment with either full or limited awareness. In addition, in most third-person perspective video games, a user sees the full body of the virtual character as well as his surroundings or environment and thus the third-person point-of-view or perspective allows users to see a more strongly characterized virtual character. Although embodiments hereof are described with respect to first-person and/or third-person point of views, haptic effects may be varied or modified according to other perspectives of the virtual camera including a bird's eye or top-down point of view, a side-scrolling (2D) point or view, an isometric third-person point of view and/or other virtual camera perspectives.

Figure 16:
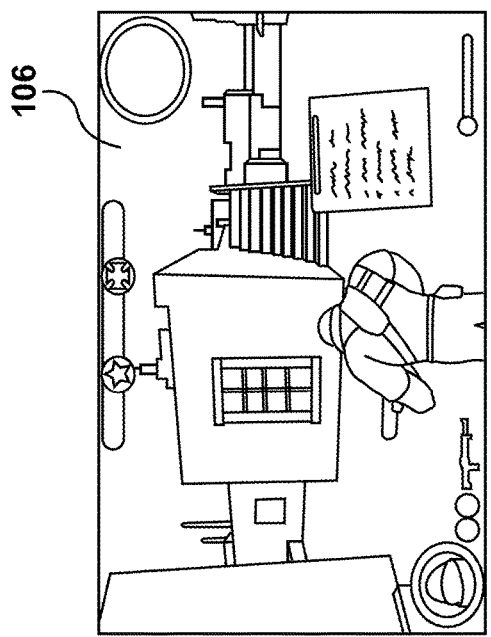
FIG. 16 is an illustration of a first person virtual camera perspective in a video game embodiment.
Figure 17:
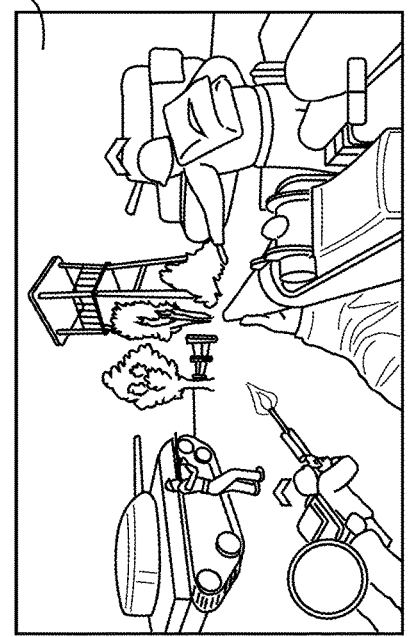
FIG. 17 is an illustration of a haptic peripheral according to an embodiment hereof, wherein the haptic peripheral is a handheld gaming controller and strong and/or trigger haptic feedback is provided to the haptic peripheral when the user is in the first person virtual camera perspective as shown in FIG. 16.

Conversely, FIG. 16 is an illustration of display 106, wherein the display displays a combat warfare video game thereon in a first-person point-of-view or perspective. FIG. 17 is a schematic illustration of haptic peripheral 302 of system 300 described above, which is operated by a user to interact with display 106 of FIG. 16. As used herein, first-person point-of-view or perspective refers to a graphical perspective rendered from the user's virtual character itself. The first-person point-of-view or perspective shows the virtual environment as seen through the eyes of the virtual character. For example, in the combat warfare video game illustrated on FIG. 16, a display 106 shows just the hands of the virtual character holding and interacting with a weapon at the bottom of display 106. In a car racing video game, the display shows just the hands of the virtual character holding a steering wheel at the bottom of the display and in a sports video game, the display shows just the hands of the virtual character holding a ball at the bottom of the display.

In embodiments hereof, the host processor and/or the local processor is configured to vary the control signal for actuators 318A, 318B, 318C, 326, 328 depending on a perspective of the virtual camera within the virtual environment. Actuators 318A, 318B, 318C are not shown in FIGS. 15 and 17 but are described above with respect to FIG. 5 for generating and applying a targeted haptic effect to joystick 322, button 330, and trigger 332, respectively. The first-person point-of-view or perspective of FIG. 16 results in at least one of the actuators generating and applying a first haptic effect, while the third-person point-of-view or perspective of FIG. 14 results in at least one of the actuators generating and applying a second haptic effect that is different from the first haptic effect. For example, the first-person point-of-view or perspective of FIG. 16 results in at least one of actuators 318A, 318B, 318C generating and applying a targeted haptic effect (represented as 1572 on FIG. 17) to the respective user input element. Such targeted trigger effects, i.e., effects output on the user input elements of the haptic peripheral, produce a sense of realism for the user by tailoring the feedback to be narrative or authored in nature. In the combat warfare video game example, the weapon of the virtual environment is emphasized by using the trigger actuators to emphasize trigger interactions. For example, trigger effects may be absent or significantly weaker in third person, yet fully present in first person.

The third-person point-of-view or perspective of FIG. 14 results in at least one of general or rumble actuators 326, 328 generating and applying a haptic effect (represented as 1570 on FIG. 15) to housing 324 of haptic peripheral 302 to simulate ambient effects. Such ambient effects, i.e., effects output on the housing of the haptic peripheral, allow a user to differentiate between the multiple perspectives so that the haptic effects feel different to the user depending on which perspective is currently utilized. Additionally, a change in virtual camera perspective often signifies a change in gameplay and in embodiments hereof, the rendered haptic effects reflect such a change in gameplay. Thus, in embodiments hereof, the same event/virtual object may trigger different haptic effects if, all other things being equal, the virtual camera perspective is different. Modifying haptic effects based on a perspective of the virtual camera allows for more immersive haptic experiences within virtual environments and allows increased control of what the user perceives from different virtual camera angles.

The virtual camera perspective may be detected by the host processor and/or the local processor detecting a change of state within the virtual environment. Stated another way, in this embodiment, virtual camera perspective may be detected without the use of perspective sensor 117 (and thus perspective sensor 117 is not required in this embodiment). For example, a user may operate a haptic peripheral to change the virtual camera perspective or the change of virtual camera perspective may occur according to a predetermined sequence of a recorded content track or video game. The change in virtual camera perspective may be detected as a change in state by the host processor and/or the local processor, and the associated haptic effects may be varied or modified as required. In another embodiment hereof, the virtual camera perspective may be detected by perspective sensor 117 that is configured to detect a user movement and is also configured to send the user movement to host processor 108 and/or local processor 112. Based on the detected or sensed user movement, host processor 108 and/or local processor 112 may change the perspective of the virtual camera and thereby the haptic effects associated with the virtual camera perspective may also change. In an embodiment, perspective sensor 117 is attached to a head-mounted haptic peripheral. Examples for perspective sensor 117 which may be attached to a head-mounted haptic peripheral include but are not limited to an accelerometer, an IR transmitter/receiver combination, or a gyroscope. Alternatively, in another embodiment, perspective sensor 117 is a webcam device that is capable of facial/eye recognition in order to register changes in user's gaze/perspective in the physical world.

Figure 18:
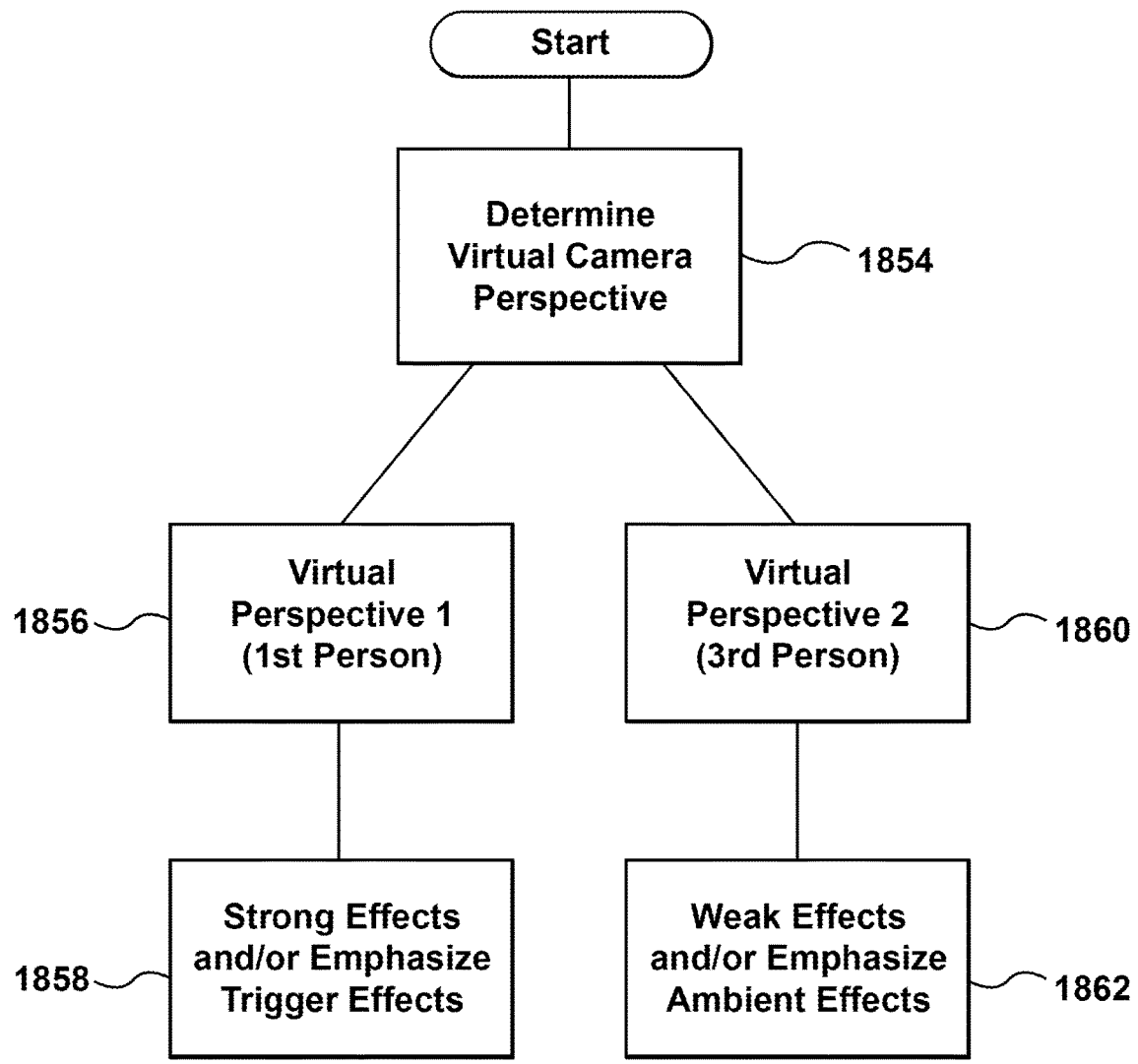
FIG. 18 is a flow chart illustrating a method for providing haptic effects to a user of a haptic peripheral according to an embodiment hereof, wherein the rendered haptic effects vary depending upon virtual camera perspective.

FIG. 18 is a flow chart illustrating a method for providing haptic effects to a user of a haptic peripheral according to an embodiment hereof, wherein the rendered haptic effects vary depending upon virtual camera perspective as described above. In an embodiment, the functionality of the flow diagram of FIG. 18 is implemented by software stored in host memory 110 of host component 104 and executed by host processor 108, and/or local memory 314 of haptic peripheral 302 and executed by local processor 312. In other embodiments, the functionality may be performed by hardware through the use of an application specific integrated circuit ("ASIC"), a programmable gate array ("PGA"), a field programmable gate array ("FPGA"), or any combination of hardware and software.

At step 1854, host processor 108 and/or local processor 312 determines the virtual camera perspective. At step 1856, a first-person point-of-view or perspective results in at least one of actuators 318A, 318B, 318C generating and applying a targeted haptic effect to the respective user input element of haptic peripheral 302 at step 1858. At step 1860, a third-person point-of-view or perspective results in at least one of general or rumble actuators 326, 328 generating and applying a haptic effect to haptic peripheral 302 at step 1862.

Haptic effects may vary according to user input element. For example, some shooting games include two triggers having separate or corresponding targeted actuators. A first haptic effect control signal may be applied to a first trigger by a first targeted actuator and a second haptic effect control signal may be applied to a second trigger by a second targeted actuator. For example, in some video games such as but not limited to Titanfall, the haptic effect control signals for each trigger (i.e., the left trigger and the right trigger) correspond to different types of weapons that are being held by the left and right hand of the computer controlled character or object. In another example, the haptic effect control signals for each trigger (i.e., the left trigger and the right controller) correspond to directional events happening to the left and right sides of the computer controlled character or object (i.e., a left side of the character is bumped or hit by something in the video game).

Figure 19:
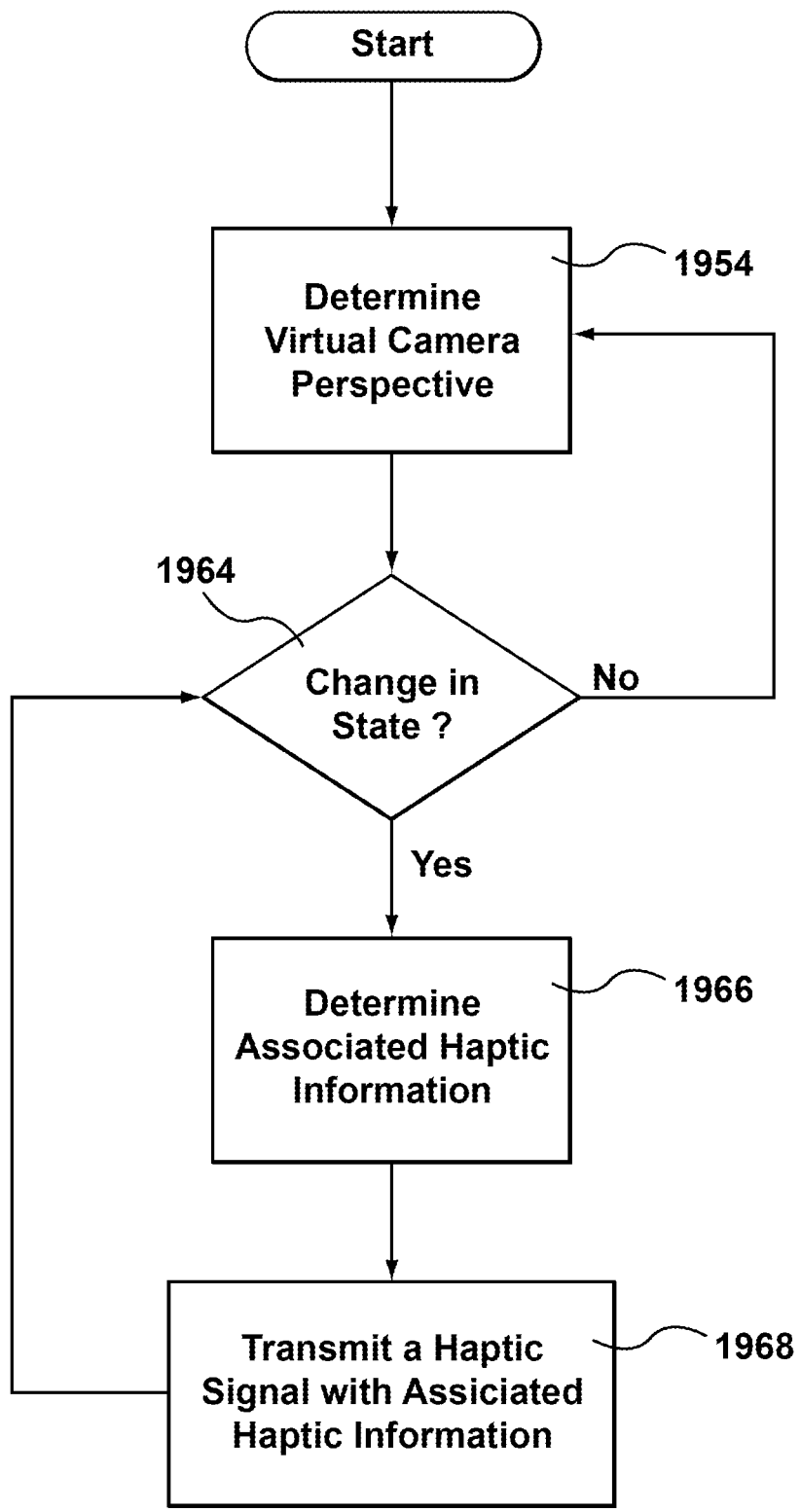
FIG. 19 is a flow chart illustrating a method for determining and transmitting a haptic signal from a host device according to an embodiment hereof, wherein the rendered haptic effects vary depending upon virtual camera perspective.

FIG. 19 is a flow chart illustrating a method for determining and transmitting a haptic signal from a host computer according to an embodiment hereof, wherein the rendered haptic effects vary depending upon virtual camera position. In an embodiment, the functionality of the flow diagram of FIG. 19 is implemented by software stored in memory 110 of host component 104 and executed by host processor 108, and/or memory 110 of haptic peripheral 102 and executed by local processor 312. In other embodiments, the functionality may be performed by hardware through the use of an application specific integrated circuit ("ASIC"), a programmable gate array ("PGA"), a field programmable gate array ("FPGA"), or any combination of hardware and software.

At step 1954, host processor 108 and/or local processor 312 determines the virtual camera perspective. At step 1964, host processor 108 determines whether there is a change in state. In one embodiment, this change can be a change in a virtual space for a game or a simulation. As an example, a user may operate haptic peripheral 302 to change the virtual camera perspective or the change of virtual camera perspective may occur according to a predetermined sequence of a recorded content track or video game. The change of virtual camera perspective is a change in state.

At step 1966, host processor 108 then determines the associated haptic effect with the change in state. As described above, the first-person point-of-view or perspective results in at least one of the actuators generating and applying a first haptic effect, while the third-person point-of-view or perspective results in at least one of the actuators generating and applying a second haptic effect that is different from the first haptic effect. For example, the first-person point-of-view or perspective results in at least one of actuator generating and applying a haptic effect to simulate trigger effects while the third-person point-of-view or perspective results in at least actuator generating and applying a haptic effect to simulate ambient effects. As described above with respect to FIG. 13, the process of determining whether there is an associated haptic effect with the change of state can be done in a multiple ways and may include accessing a pre-defined mapping of change of state and haptic effects.

At step 1968, host computer 104 transmits the haptic information to haptic peripheral 302 using a haptic or control signal with the associated haptic information. The transmission of the haptic information can be done either through wired or wireless communication, as previously described. Local processor 312 of haptic peripheral 302 thus receives the control signal indicating that haptic peripheral 302 should output a haptic effect which varies depending on the virtual camera perspective.

Figure 20:
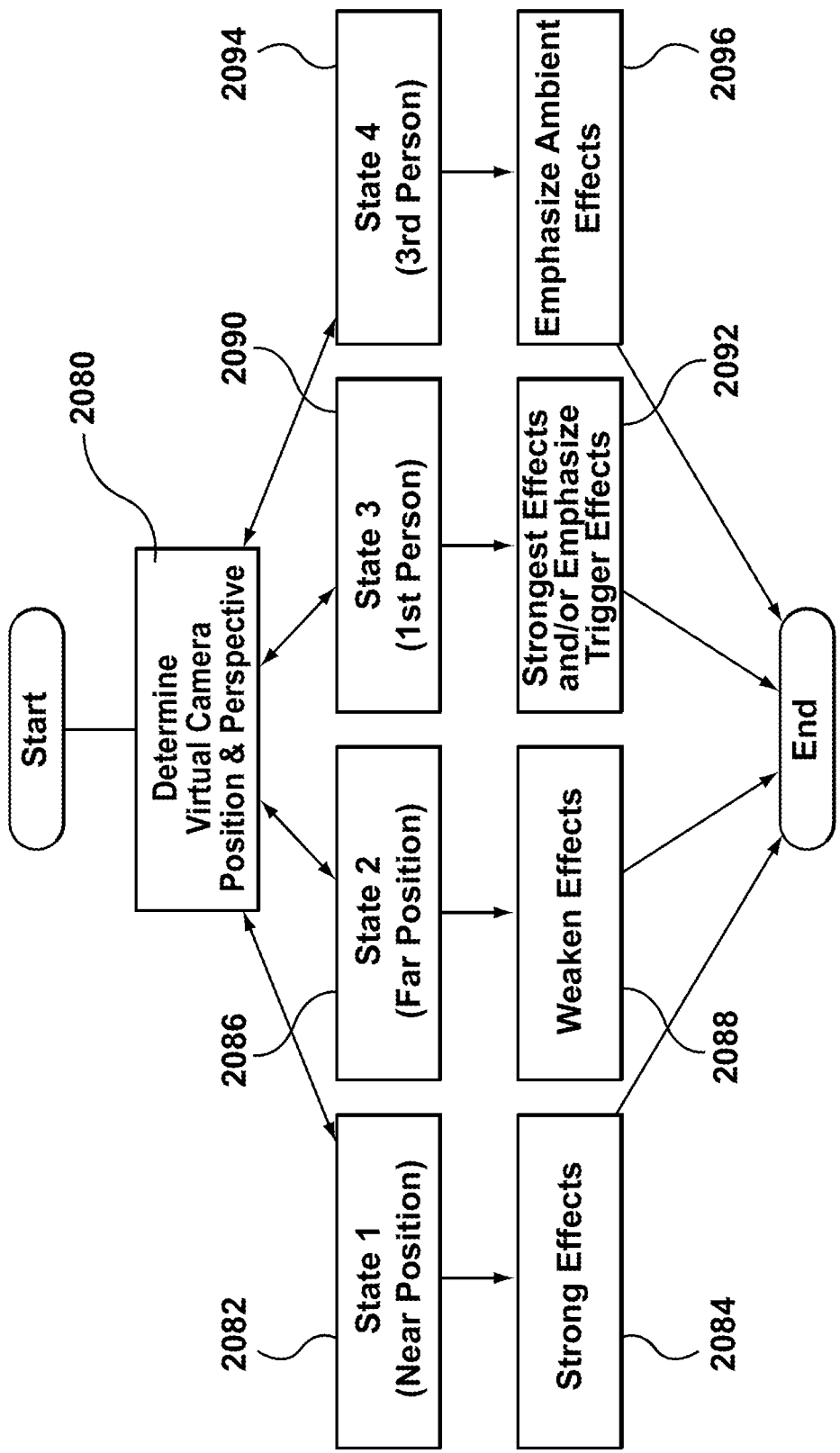
FIG. 20 is a flow chart illustrating a method for providing haptic effects to a user of a haptic peripheral according to an embodiment hereof, wherein the rendered haptic effects vary depending upon virtual camera position as well as virtual camera perspective.

FIG. 20 is a flow chart illustrating a method for providing haptic effects to a user of a haptic peripheral according to an embodiment hereof, wherein the rendered haptic effects vary depending upon virtual camera position as well as virtual camera perspective. The mental model of what haptic effects users expect to be played are most certainly influenced by both virtual camera position and virtual camera perspective. Thus, a system that modifies or varies haptic effects depending on both virtual camera position and virtual camera perspective will provide a more immersive and enjoyable experience for the user. Haptic effects output by the haptic peripheral will automatically update or vary according to user-initiated changes in the position and/or perspective of the virtual camera and thus may be considered dynamic haptic effects. In an embodiment, the functionality of the flow diagram of FIG. 20 is implemented by software stored in the host memory of the host component and executed by host processor 108, and/or the local memory of the haptic peripheral and executed by the local processor. In other embodiments, the functionality may be performed by hardware through the use of an application specific integrated circuit ("ASIC"), a programmable gate array ("PGA"), a field programmable gate array ("FPGA"), or any combination of hardware and software.

At step 2080, the host processor and/or the local processor determines the position or location of the virtual camera with respect to a virtual object that is a source or cause of a haptic effect and the perspective of the virtual camera. In determining the position of the virtual camera, the host processor and/or the local processor determines the virtual distance between the virtual camera and the virtual object.

At step 2082, the host processor and/or the local processor determines a state 1 in which the virtual distance between the virtual camera and the virtual object is a near or close position, which results in the actuator generating and applying strong haptic effects at step 2084. At step 2086, the host processor and/or the local processor determines a state 2 in which the virtual distance between the virtual camera and the virtual object is a far or distant position, which results in the actuator generating and applying weaker haptic effects at step 2088. At step 2090, the host processor and/or the local processor determines a state 3 in which a first-person point-of-view or perspective results in at least one of actuator generating and applying a targeted haptic effect to a user input element of the haptic peripheral at step 2092. At step 2094, the host processor and/or the local processor determines a state 4 in which a third-person point-of-view or perspective results in at least one of general or rumble actuators generating and applying a haptic effect to the haptic peripheral at step 2096.

In determining the type of haptic effects to be executed and provided to the user according to the flow chart of FIG. 20 according to an embodiment hereof, a priority system may be utilized in order to limit the number of effects played at once as to not overwhelm the user. More particularly, with reference to FIG. 20, the host processor and/or the local processor may determine that two different states exist at the same time. In a single screen embodiment, the two different states exist on the same screen. In a split screen display embodiment, a first state may be displayed on a first half of a split screen, while a second state may be displayed on a second half of a split screen. In a picture-in-picture display embodiment, a first state may be displayed on a primary screen while a second state may be displayed on a secondary screen that overlays a portion of the primary screen. For example, the host processor and/or the local processor may determine that State 2 exists (in which the virtual camera is far away from the virtual object) as well as State 3 (in which the virtual camera has a first-person perspective or point-of-view). The associated haptic effect for State 2 is to weaken effects associated with the virtual object, while the associated haptic effect for State 3 is to emphasize or strengthen trigger effects. The associated haptic effects for these two states may be ordered according to a pre-defined priority system employed by the host processor and/or the local processor. For example, the pre-defined priority system may dictate that the associated haptic effects of State 3 take priority over the associated haptic effects of State 2, and thus the trigger effects are played prior to the weakened effects associated with the virtual object in a sequential manner, or alternatively the trigger effects are played and the weakened effects associated with the virtual object are omitted. Alternately, the pre-defined priority system may dictate that the associated haptic effects of State 2 take priority over the associated haptic effects of State 3 but do not take priority over the associated haptic effects of State 1, if and when State 1 is determined. In another embodiment hereof, the priority system may be based on user attention or interest. For example, in the split-screen embodiment or picture-in-picture display embodiment, a camera may sense or detect to which screen or screen half a user's eyes are directed in order to determine which state is more relevant or preferred by the user. It will be apparent to one of ordinary skill in the art that the above example of a pre-defined priority system is exemplary in nature and any pre-defined priority system may be utilized as desired by the developer of the virtual environment.

According to another embodiment hereof, in determining the type of haptic effects to be executed and provided to the user according to the flow chart of FIG. 20, the host processor and/or the local processor may combine or mix the associated haptic effects when it is determined that two different states exist at the same time. For example, the host processor and/or the local processor may determine that State 2 exists (in which the virtual camera is far away from the virtual object) as well as State 4 (in which the virtual camera has a third-person perspective or point-of-view). The associated haptic effect for State 2 is to weaken effects associated with the virtual object, while the associated haptic effect for State 4 is to output ambient effects. When the host processor and/or the local processor combines or mixes the associated haptic effects of State 2 and State 4, weakened ambient effects are output by the haptic peripheral.

Figure 21:
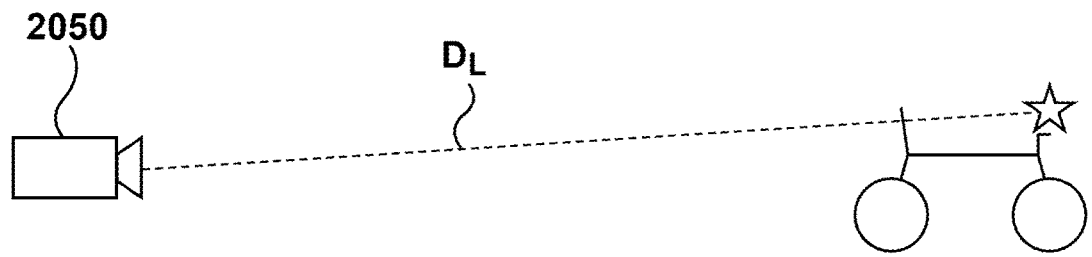
FIG. 21 is a schematic illustration of haptic effects that result if the associated haptic effects for two different states of the flow chart of FIG. 20 exist at the same time, wherein weak ambient haptic effects are provided when a virtual camera is far away from a virtual object and in a third person perspective.

FIGS. 21-24 are schematic illustrations of haptic effects that may result if the host processor and/or the local processor combines or mixes associated haptic effects for two different states that exist at the same time. It will be apparent to one of ordinary skill in the art that the below examples of how the associated haptic effects are combined/mixed are exemplary in nature and various methods of combining/mixing the effects may be utilized as desired by the developer of the virtual environment. FIG. 21 illustrates a scenario in which the host processor and/or the local processor determines that State 2 exists (in which virtual camera 2050 is far away from the virtual object as indicated by relatively longer virtual distance $D_L$) as well as State 4 (in which virtual camera 2050 has a third-person perspective or point-of-view). The third-person perspective is illustrated by a user (represented as a star in FIGS. 21-24) having a backseat or slightly further away viewpoint relative to virtual camera 2050 in FIG. 21 and FIG. 23, as opposed to the user having a frontseat or slightly closer viewpoint relative to virtual camera 2050 in FIG. 22 and FIG. 24. As described above, the associated haptic effect for State 2 is to weaken effects associated with the virtual object, while the associated haptic effect for State 4 is to output ambient effects. When the host processor and/or the local processor combined or mixes the associated haptic effects of State 2 and State 4, weakened ambient effects are output by the haptic peripheral. In another embodiment, as described above, a pre-defined priority system may dictate that the associated haptic effects of one state take priority of the associated haptic effects of the other state.

Figure 22:
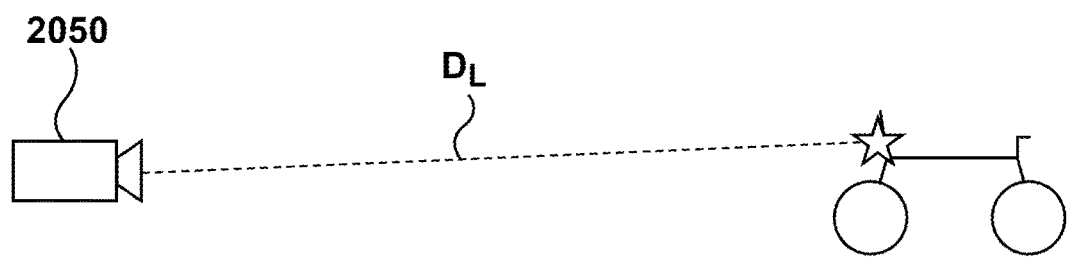
FIG. 22 is a schematic illustration of haptic effects that result if the associated haptic effects for two different states of the flow chart of FIG. 20 exist at the same time, wherein weak trigger haptic effects are provided when a virtual camera is far away from a virtual object and in a first person perspective.

FIG. 22 illustrates a scenario in which the host processor and/or the local processor determines that State 2 exists (in which virtual camera 2050 is far away from the virtual object as indicated by relatively longer virtual distance $D_L$) as well as State 3 (in which virtual camera 2050 has a first-person perspective or point-of-view). The associated haptic effect for State 2 is to weaken effects associated with the virtual object, while the associated haptic effect for State 3 is to output trigger effects. When the host processor and/or the local processor combined or mixes the associated haptic effects of State 2 and State 3, weakened trigger effects are output by the haptic peripheral. In another embodiment, as described above, a pre-defined priority system may dictate that the associated haptic effects of one state take priority of the associated haptic effects of the other state.

Figure 23:
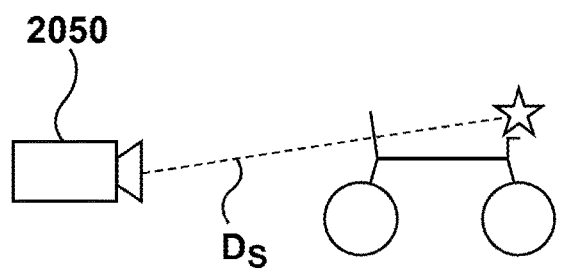
FIG. 23 is a schematic illustration of haptic effects that result if the associated haptic effects for two different states of the flow chart of FIG. 20 exist at the same time, wherein strong ambient haptic effects are provided when a virtual camera is nearby or close to a virtual object and in a third person perspective.

FIG. 23 illustrates a scenario in which the host processor and/or the local processor determines that State 1 exists (in which virtual camera 2050 is close or near to the virtual object as indicated by relatively shorter virtual distance $D_S$) as well as State 4 (in which virtual camera 2050 has a third-person perspective or point-of-view). As described above, the associated haptic effect for State 1 is to strengthen effects associated with the virtual object, while the associated haptic effect for State 4 is to output ambient effects. When the host processor and/or the local processor combines or mixes the associated haptic effects of State 1 and State 4, stronger ambient effects are output by the haptic peripheral. In another embodiment, as described above, a pre-defined priority system may dictate that the associated haptic effects of one state take priority of the associated haptic effects of the other state.

Figure 24:
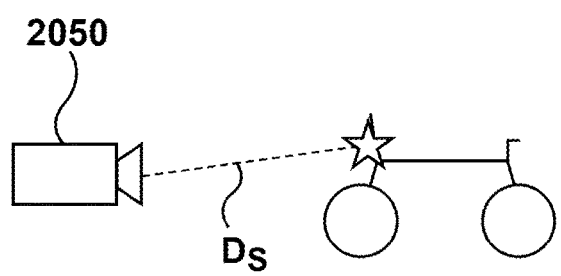
FIG. 24 is a schematic illustration of haptic effects that result if the associated haptic effects for two different states of the flow chart of FIG. 20 exist at the same time, wherein strong trigger haptic effects are provided when a virtual camera is nearby or close to a virtual object and in a first person perspective.

FIG. 24 illustrates a scenario in which the host processor and/or the local processor determines that State 1 exists (in which virtual camera 2050 is close or near to the virtual object as indicated by relatively shorter virtual distance $D_S$) as well as State 3 (in which virtual camera 2050 has a first-person perspective or point-of-view). As described above, the associated haptic effect for State 1 is to strengthen effects associated with the virtual object, while the associated haptic effect for State 3 is to output trigger effects. When the host processor and/or the local processor combined or mixes the associated haptic effects of State 1 and State 3, stronger trigger effects are output by the haptic peripheral. In another embodiment, as described above, a pre-defined priority system may dictate that the associated haptic effects of one state take priority of the associated haptic effects of the other state.

Embodiments described above relate to modifying haptic effects based on a zoom state of a virtual camera with respect to a virtual object that is a source or cause of a haptic effect and/or modifying haptic effects based on a perspective of the virtual camera. In another embodiment hereof, haptic effects may be modified based on the degree of focus of the virtual camera. More particularly, as described above, when working with a virtual camera in virtual reality programs, a user may use functions like pan, zoom, or change focus and focal points. Haptic strength or volume may vary based on whether a virtual object is in focus or out of focus. For example, weaker haptic effects are played or output when the virtual object is out of focus relative to the virtual camera and stronger haptic effects are played or output when the virtual object is in focus relative to the virtual camera.

In addition, although embodiments described above relate to computers configured to generate a virtual environment to a user on a display, modifying haptic effects based on a zoom state of a virtual camera and/or modifying haptic effects based on a perspective of the virtual camera may be applied to other types of devices, including devices that are not configured to generate a virtual environment to a user. For example, media services as well as storage media such as DVDs or Blu-ray Discs may be configured with associated haptic effects in order to enhance a user's viewing experience. Media services may be, for example, a broadcast network service, a cable communication service, a satellite communication service, a cloud video streaming service, a gaming console, or any other type of service that is a source of audio-video content or data and associated haptic content or data. A user viewing the media service or storage media may be holding a haptic peripheral or have attached thereto a wearable haptic peripheral. The haptic peripheral includes an actuator, and the actuator is configured to receive a control signal from the media service or storage media and output a haptic effect to the haptic peripheral. The haptic effects are related to or associated with the content of the media service or storage media. Such haptic effects may be varied or modified based on a zoom state of a virtual camera of the media service or storage media and/or may be varied or modified based on a perspective of the virtual camera thereof. In yet another example, a real-life viewing device such as but not limited to a camera or binoculars may be configured with associated haptic effects in order to enhance a user's viewing experience. A user using the camera/binoculars may be holding a haptic peripheral or have attached thereto a wearable haptic peripheral. The haptic peripheral includes an actuator, and the actuator is configured to receive a control signal from the camera/binoculars and output a haptic effect to the haptic peripheral. Such haptic effects may be varied or modified based on the zoom state of the camera/binoculars.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system comprising:
a host computer configured to generate a virtual environment on a display;
a processor;
a haptic peripheral including an actuator, wherein the actuator is configured to receive a control signal from the processor and output a haptic effect caused by a virtual object in the virtual environment to the haptic peripheral in response to the control signal from the processor, and wherein the processor is configured to vary the control signal for the actuator depending on a zoom state of a virtual camera of the virtual environment such that a first zoom state results in the actuator generating and applying the haptic effect caused by the virtual object in the virtual environment as a first haptic effect, and a second zoom state results in the actuator generating and applying the haptic effect caused by the virtual object in the virtual environment as a second haptic effect, the virtual object appearing closer in the second zoom state than in the first zoom state and the first haptic effect being weaker than the second haptic effect.

2. The system of claim 1, wherein the zoom state of the virtual camera is detected by a proximity sensor configured to detect an actual distance between the haptic peripheral and the host computer, the proximity sensor being configured to send the actual distance to the processor.

3. The system of claim 2, wherein the proximity sensor is coupled to the haptic peripheral or is a wearable sensor.

4. The system of claim 1, wherein the zoom state of the virtual camera is detected by a proximity sensor configured to detect a user movement, the proximity sensor being configured to send the user movement to the processor.

5. The system of claim 4, wherein the proximity sensor is a camera device.

6. The system of claim 1, wherein the zoom state of the virtual camera is detected by the processor detecting a change of state within the virtual environment.

7. The system of claim 1, wherein the processor is disposed in the host computer.

8. The system of claim 1, wherein the processor is disposed in the haptic peripheral.

9. The system of claim 1, wherein the processor is also configured to vary the control signal for the actuator depending on a perspective of the virtual camera within the virtual environment such that a first perspective results in the actuator generating and applying the haptic effect as a third haptic effect and a second perspective results in the actuator generating and applying the haptic effect as a fourth haptic effect, wherein the first perspective is a first person point of view and the second perspective is a third person point of view, the third haptic effect being different than the fourth haptic effect.

10. The system of claim 9, wherein the third haptic effect is a trigger haptic effect, and the fourth haptic effect is an ambient haptic effect, wherein the trigger haptic effect is output on a user input element of the haptic peripheral, and the ambient haptic effect is output on a housing of the haptic peripheral.

11. The system of claim 1, wherein the system includes multiple haptic peripherals, each of which includes an actuator configured to receive a control signal from the processor and output a haptic effect to the respective haptic peripheral in response to the control signal from the processor, and wherein the haptic effects output by the actuators will automatically update in a seamless manner according to control signals received from the processor.

12. A system comprising:
a host computer configured to generate a virtual environment on a display;
a processor;
a haptic peripheral including an actuator, wherein the actuator is configured to receive a control signal from the processor and output a haptic effect caused by a virtual object in the virtual environment to the haptic peripheral in response to the control signal from the processor, and
wherein the processor is configured to vary the control signal for the actuator depending on a perspective of a virtual camera within the virtual environment such that a first perspective results in the actuator generating and applying the haptic effect caused by the virtual object in the virtual environment as a first haptic effect, and a second perspective results in the actuator generating and applying the haptic effect caused by the virtual object in the virtual environment as a second haptic effect, the first haptic effect being different than the second haptic effect.

13. The system of claim 12, wherein the first perspective is a first person point of view and the second perspective is a third person point of view, the first haptic effect being a trigger haptic effect, and the second haptic effect being an ambient haptic effect, wherein the trigger haptic effect is output on a user input element of the haptic peripheral, and the ambient haptic effect is output on a housing of the haptic peripheral.

14. The system of claim 12, wherein the perspective of the virtual camera is detected by the processor detecting a change of state within the virtual environment.

15. The system of claim 12, wherein the perspective of the virtual camera is detected by a perspective sensor configured to detect a user movement, the perspective sensor being configured to send the user movement to the processor.

16. The system of claim 12, wherein the processor is also configured to vary the control signal for the actuator depending on a zoom state of a virtual camera of the virtual environment such that a first zoom state results in the actuator generating and applying a third haptic effect and a second zoom state results in the actuator generating and applying a fourth haptic effect, the virtual object appearing closer in the second zoom state than in the first zoom state and the third haptic effect being weaker than the fourth haptic effect.

17. The system of claim 12, wherein the processor is disposed in the host computer.

18. The system of claim 12, wherein the processor is disposed in the haptic peripheral.

19. A system comprising:
a host computer configured to generate a virtual environment to a user on a display;
a processor;
a haptic peripheral including an actuator, wherein the actuator is configured to receive a control signal from the processor and output a haptic effect to the haptic peripheral in response to the control signal from the processor, and
wherein the processor is configured to vary the control signal for the actuator depending on a zoom state of a virtual camera of the virtual environment such that a first zoom state results in the actuator generating and applying a first haptic effect and a second zoom state results in the actuator generating and applying a second haptic effect, a virtual object appearing closer in the second zoom state than in the first zoom state, and
wherein the processor is also configured to vary the control signal for the actuator depending on a perspective of the virtual camera within the virtual environment such that a first perspective results in the actuator generating and applying a third haptic effect and a second perspective results in the actuator generating and applying a fourth haptic effect, the first perspective being a first person point of view and the second perspective being a third person point of view, and
wherein the first haptic effect, the second haptic effect, the third haptic effect, and the fourth haptic effect are different from each other.

20. The system of claim 19, wherein the first haptic effect is weaker than the second haptic effect, the third haptic effect being a trigger haptic effect and the fourth haptic effect being an ambient haptic effect, wherein the trigger haptic effect is output on a user input element of the haptic peripheral, and the ambient haptic effect is output on a housing of the haptic peripheral.

21. A host computer comprising:
a wired or wireless communication unit configured to communicate signaling with a haptic peripheral;
a processor;
a memory storing non-transitory computer readable instructions which, when executed by the processor, causes the processor:
to generate a virtual environment on a display,
to determine a position in the virtual environment of a virtual camera that captures a field of view for the virtual environment,
to determine that a haptic effect is to be generated, wherein a virtual object in the virtual environment is a cause of the haptic effect,
to determine a virtual distance between the virtual camera and the virtual object in the virtual environment,
to generate a control signal which indicates that a haptic effect dependent on the virtual distance is to be generated,
to transmit, via the wired or wireless communication unit, the control signal to the haptic peripheral to cause the haptic peripheral to generate the haptic effect which is dependent on the virtual distance.

22. The host computer of claim 21, wherein the virtual distance represents a distance between a virtual character in the virtual environment and the virtual object causing the haptic effect.

23. The host computer of claim 21, wherein the non-transitory computer readable instructions are further configured to cause the processor to determine whether a perspective of the virtual camera is a first person point-of-view or is a third person point-of-view, wherein a first haptic effect is associated with the virtual distance, and a second haptic effect is associated with the virtual camera perspective, and wherein the non-transitory computer readable instructions are further configured to cause the processor to determine: (i) that the haptic effect to be generated is the first haptic effect, and that the first haptic effect takes priority over the second haptic effect, or (ii) that the haptic effect to be generated is a mixture of the first haptic effect and the second haptic effect.

* * * * *